US012293329B2

(12) United States Patent
Li et al.

(10) Patent No.: US 12,293,329 B2
(45) Date of Patent: May 6, 2025

(54) INVENTORY SYSTEM AND METHOD

(71) Applicant: Beijing Geekplus Technology Co., Ltd., Beijing (CN)

(72) Inventors: Hongbo Li, Beijing (CN); Honghan Lu, Beijing (CN); Kun Wang, Beijing (CN); Kai Liu, Beijing (CN); Kaozhun Li, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 0 days.

(21) Appl. No.: 17/914,570

(22) PCT Filed: May 12, 2021

(86) PCT No.: PCT/CN2021/093422
§ 371 (c)(1),
(2) Date: Sep. 26, 2022

(87) PCT Pub. No.: WO2021/228158
PCT Pub. Date: Nov. 18, 2021

(65) Prior Publication Data
US 2023/0206174 A1   Jun. 29, 2023

(30) Foreign Application Priority Data

May 12, 2020   (CN) .......................... 202010399405.2
Sep. 8, 2020   (CN) .......................... 202010934150.5

(51) Int. Cl.
*G06Q 10/00*   (2023.01)
*B65G 1/04*    (2006.01)
(Continued)

(52) U.S. Cl.
CPC ......... *G06Q 10/087* (2013.01); *B65G 1/0492* (2013.01); *B65G 1/1371* (2013.01); *B65G 1/1375* (2013.01)

(58) Field of Classification Search
CPC ..... B65G 1/0407; B65G 1/1378; G06Q 10/08
(Continued)

(56) References Cited

U.S. PATENT DOCUMENTS 4,762,457 A    8/1988   Stefan
8,594,834 B1   11/2013  Clark et al.
(Continued)

FOREIGN PATENT DOCUMENTS

CA   3049395 A1   7/2018
CA   3112489 A1   3/2020
(Continued)

OTHER PUBLICATIONS

Patent Cooperation Treaty, International Search Report, International Application No. PCT/CN2021/093422 (Aug. 11, 2021).
(Continued)

*Primary Examiner* — Rokib Masud
(74) *Attorney, Agent, or Firm* — Leydig, Voit & Mayer, Ltd.

(57) ABSTRACT

Disclosed are a method, control system, storage and retrieval equipments, and handling equipments. The control system is configured to: determine a target inventory receptacle from inventory receptacles in a storage area of an inventory system; and determine a target storage and retrieval equipment and a target handling equipment, and send a dispatching instruction to the target storage and retrieval equipment and the target handling equipment. The target storage and retrieval equipment is configured to: drive, in response to the dispatching instruction, to a position specified in the dispatching instruction, take out the target inventory receptacle, and directly or indirectly undertake the target inventory receptacle to the target handling equipment. The target handling equipment is configured to: drive, in response to the dispatching instruction, to a position specified in the
(Continued)

dispatching instruction, undertake the target inventory receptacle, and transport the target inventory receptacle from the storage area to a workstation.

20 Claims, 12 Drawing Sheets

(51) Int. Cl.
*B65G 1/137* (2006.01)
*G06Q 10/087* (2023.01)

(58) Field of Classification Search
USPC .......................................................... 705/28
See application file for complete search history.

(56) References Cited

U.S. PATENT DOCUMENTS

| | | | |
|---|---|---|---|
| 8,718,814 | B1 | 5/2014 | Clark et al. |
| 2017/0036798 | A1* | 2/2017 | Prahlad ................ B65G 1/1373 |
| 2017/0043953 | A1 | 2/2017 | Battles et al. |
| 2019/0106086 | A1* | 4/2019 | Giraud .................. B60S 1/0848 |
| 2019/0343317 | A1* | 11/2019 | Cantrell ............. G07C 9/00563 |
| 2021/0090001 | A1 | 3/2021 | Glass et al. |

FOREIGN PATENT DOCUMENTS

| | | | |
|---|---|---|---|
| CN | 109279252 A | | 1/2019 |
| CN | 109377125 A | | 2/2019 |
| CN | 208665380 U | | 3/2019 |
| CN | 109573443 A | | 4/2019 |
| CN | 109573449 A | | 4/2019 |
| CN | 109592280 A | | 4/2019 |
| CN | 109969674 A | | 7/2019 |
| CN | 109987366 A | | 7/2019 |
| CN | 110239873 A | | 9/2019 |
| CN | 110803444 A | | 2/2020 |
| CN | 210162597 U | | 3/2020 |
| CN | 210162598 U | | 3/2020 |
| CN | 110949923 A | | 4/2020 |
| CN | 110989572 A | | 4/2020 |
| CN | 111361908 | * | 7/2020 |
| CN | 111361908 A | | 7/2020 |
| CN | 111724104 A | | 9/2020 |
| JP | 631603 A | | 1/1988 |
| JP | 8333006 A | | 12/1996 |
| JP | 1111611 A | | 1/1999 |
| JP | 11116005 A | | 4/1999 |
| JP | 11116006 A | | 4/1999 |
| JP | 2004196440 A | | 7/2004 |
| JP | 2018188236 A | | 11/2018 |
| WO | 2019123254 A1 | | 6/2019 |

OTHER PUBLICATIONS

Patent Cooperation Treaty, Written Opinion of the International Searching Authority, International Application No. PCT/CN2021/093422 (Aug. 11, 2021).
Office Action issued in corresponding Chinese Patent Application No. 202010934150.5, dated Jul. 9, 2021.
Notice of Reasons for Refusal in corresponding Japanese Patent Application No. 2022-567680, dated Dec. 21, 2023.
Rejection Decision in corresponding Chinese Patent Application No. 202010399405.2, dated Apr. 3, 2024.
Beijing Kejie Zhiyun Technology Service, "Human-machine collaboration: Application of big data and artificial intelligence in logistics," pp. 157-158 (Aug. 31, 2019).
Wu et al., "Automation of machining systems," Mechanical Industry Press, pp. 139-140 (Oct. 31, 1992).
Third Office Action in corresponding Chinese Patent Application No. 202010399405.2, dated Jan. 26, 2024.
Guo, Qiong, "Advanced Manufacturing Technology," Machinery Industry Press, pp. 171-173 (Oct. 31, 2017).
Search Report in corresponding European Patent Application No. 21804916.1, dated Aug. 28, 2023.
Second Office Action in corresponding Chinese Patent Application No. 202010399405.2, dated Sep. 8, 2023.
First Office Action in corresponding Chinese Patent Application No. 202010399405.2, dated Feb. 8, 2023.

* cited by examiner

INVENTORY SYSTEM AND METHOD

CROSS-REFERENCE TO RELATED APPLICATIONS

This application is a National Stage of International Application No. PCT/CN021/093422, filed on May 12, 2021, which claims priority to Chinese Patent Application No. 202010399405.2, filed on May 12, 2020, and Chinese Patent Application No. 202010934150.5, filed on Sep. 8, 2020. The disclosures of all of the aforementioned patent applications are hereby incorporated by reference in their entireties.

TECHNICAL FIELD

Embodiments of this application relate to the field of warehousing technologies, and in particular, to an inventory system and method.

BACKGROUND

In a "goods-to-person" scenario, a robot can take out items or receptacles required in order information from warehouse shelves according to the order information, and transport the removed items or receptacles to a picking station. Operators or robotic arms at the picking station then complete the picking operation.

At present, in the picking process of the related art, the robot not only needs to perform the operation of "taking out" from the shelves, but also needs to perform the operation of "carrying" the take-out result of the "taking out" operation, which undoubtedly wastes a lot of time in carrying, resulting in reduced picking efficiency. The "taking out" operation on the shelves usually requires robots with special mechanisms to perform, and the costs of such robots are relatively high. If a larger quantity of such robots are arranged to join the picking process to improve the picking efficiency, the increase in the quantity of robots increases the costs of the robots.

SUMMARY

Embodiments of this application provide an inventory system and method, to at least partially resolve the problem of incompatibility between robot picking efficiency and robot costs in an inventory system.

According to a first aspect, an embodiment of this application provides an inventory system. The system includes: a control system, a plurality of storage and retrieval equipments, and a plurality of handling equipments, where the plurality of storage and retrieval equipments and the plurality of handling equipments are respectively in communication with the control system, the plurality of storage and retrieval equipments operate in a storage area of the inventory system, a plurality of inventory racks are deployed in the storage area, each of the inventory racks has a plurality of compartments, each of the compartments includes a plurality of storage spaces, and an inventory receptacle is placed on each of the storage spaces.

In an embodiment, the control system is configured to: determine a target inventory receptacle from the inventory receptacles in the storage area; and respectively determine a target storage and retrieval equipment and a target handling equipment from the plurality of storage and retrieval equipments and the plurality of handling equipments, and respectively send a dispatching instruction to the target storage and retrieval equipment and the target handling equipment.

In an embodiment, the target storage and retrieval equipment is configured to: drive, in response to the dispatching instruction, to a position specified in the dispatching instruction, take out the target inventory receptacle, and directly or indirectly undertake the target inventory receptacle to the target handling equipment.

In an embodiment, the target handling equipment is configured to: drive, in response to the dispatching instruction, to a position specified in the dispatching instruction, undertake the target inventory receptacle, and transport the target inventory receptacle from the storage area to a workstation specified in the dispatching instruction for a service operation.

According to a second aspect, an embodiment of this application further provides an inventory method. The method includes:

determining, by a control system, a target inventory receptacle from inventory receptacles in a storage area of an inventory system;

respectively determining, by the control system, a target storage and retrieval equipment and a target handling equipment from a plurality of storage and retrieval equipments and a plurality of handling equipments, and respectively sending a dispatching instruction to the target storage and retrieval equipment and the target handling equipment, where the plurality of storage and retrieval equipments and the plurality of handling equipments are respectively in communication with the control system, the plurality of storage and retrieval equipments operate in the storage area, a plurality of inventory racks are deployed in the storage area, each of the inventory racks has a plurality of compartments, each of the compartments includes a plurality of storage spaces, and an inventory receptacle is placed on each of the storage spaces;

driving, by the target storage and retrieval equipment in response to the dispatching instruction, to a position specified in the dispatching instruction, taking out the target inventory receptacle, and directly or indirectly undertaking the target inventory receptacle to the target handling equipment; and driving, by the target handling equipment in response to the dispatching instruction, to a position specified in the dispatching instruction, undertaking the target inventory receptacle, and transporting the target inventory receptacle from the storage area to a workstation specified in the dispatching instruction for a service operation.

According to a third aspect, an embodiment of this application further provides an inventory system. The system includes: one or more control systems, one or more storage and retrieval equipments, one or more handling equipments, and one or more destinations, where a warehouse is formed by at least one inventory rack, the inventory rack is provided with a plurality of floors, and the one or more control systems are in communication with the storage and retrieval equipments and the handling equipments respectively, where:

space between the at least one inventory rack forms a first aisle, each floor of the inventory rack is provided with at least two storage spaces in a longitudinal direction, a row of first bottom-floor storage spaces are arranged on a bottom floor of at least one side of the inventory rack adjacent to the first aisle, at least some of the first bottom-floor storage spaces on the bottom floor of the inventory rack are provided with inventory receptacles, and at least some of higher-floor storage spaces on higher floors other than the bottom floor of the inventory rack are provided with inventory receptacles; and space where no first bottom-floor storage space is arranged on the bottom floor of the inventory rack forms a second aisle, and the second aisle runs through the bottom floor of the inventory rack.

In an embodiment, the control system is configured to determine, according to a handling task, a storage and retrieval equipment and/or a handling equipment that performs the handling task, and respectively send a handling instruction for performing the handling task to the storage and retrieval equipment and the handling equipment.

In an embodiment, the storage and retrieval equipment drives in the first aisle and is configured to take out, according to the handling instruction sent by the control system, a target inventory receptacle indicated in the handling instruction from a higher-floor storage space of the inventory rack and put the target inventory receptacle in an idle first bottom-floor storage space, or take out the target inventory receptacle indicated in the handling instruction from the first bottom-floor storage space and put the target inventory receptacle in the higher-floor storage space.

In an embodiment, the handling equipment drives in the first aisle and/or the second aisle, and is configured to take out, according to the handling instruction sent by the control system, the target inventory receptacle indicated in the handling instruction from the first bottom-floor storage space or put the target inventory receptacle indicated in the handling instruction in the first bottom-floor storage space, and transport the target inventory receptacle indicated in the handling instruction between the first bottom-floor storage space and the one or more destinations.

According to a fourth aspect, an embodiment of this application further provides an inventory method, where a warehouse includes one or more storage and retrieval equipments, one or more handling equipments, and one or more destinations, the warehouse is formed by at least one inventory rack, the inventory rack is provided with a plurality of floors, space between the at least one inventory rack forms a first aisle, each floor of the inventory rack is provided with at least two storage spaces in a longitudinal direction, a row of first bottom-floor storage spaces are arranged on a bottom floor of at least one side of the inventory rack adjacent to the first aisle, at least some of the first bottom-floor storage spaces on the bottom floor of the inventory rack are provided with inventory receptacles, at least some of higher-floor storage spaces on higher floors other than the bottom floor of the inventory rack are provided with inventory receptacles, space where no first bottom-floor storage space is arranged on the bottom floor of the inventory rack forms a second aisle, the second aisle runs through the bottom floor of the inventory rack, and the method includes:

determining a to-be-performed handling task;

determining a storage and retrieval equipment and/or a handling equipment that performs the handling task according to the handling task; and respectively sending a handling instruction for performing the handling task to the storage and retrieval equipment and the handling equipment, so that the storage and retrieval equipment drives in the first aisle, the handling equipment drives in the first aisle and/or the second aisle, and the storage and retrieval equipment and the handling equipment cooperate to transport a target inventory receptacle indicated in the handling instruction from a higher-floor storage space or a first bottom-floor storage space of the warehouse to the destination, or transport the target inventory receptacle indicated in the handling instruction from the destination to the higher-floor storage space or the first bottom-floor storage space of the warehouse.

The embodiments of this application provide an inventory system. During inventory picking, a storage and retrieval equipment and a handling equipment are used together. The control system may dispatch the storage and retrieval equipment to drive to the target inventory receptacle in the storage area of the inventory system. The storage and retrieval equipment can only operate in the storage area and take out the target inventory receptacle from the inventory receptacle in the storage area for vertical handling. In addition, the control system may further dispatch the handling equipment to drive to the target inventory receptacle in the storage area of the inventory system. The handling equipment may drive back and forth between the storage area and the workstation, and horizontally transport the target inventory receptacle taken out by the storage and retrieval equipment to the workstation specified in the dispatching instruction for a service operation.

By adopting the solution of this application, it can be ensured that the storage and retrieval equipment gives full play to its initiative in the picking operation, without wasting a lot of time and handling resources in the horizontal handling operation. In this way, there is no need to arrange more storage and retrieval equipments to improve the picking efficiency, thereby reducing the equipment costs caused by the increase of storage and retrieval equipments. In addition, since the handling equipment has lower costs than the storage and retrieval equipment and higher flexibility than the storage and retrieval equipment, not only the equipment costs can be reduced, but also more horizontal handling costs can be reduced in the horizontal handling operation. As can be seen, by adopting the solution of this application, the storage and retrieval equipment and the handling equipment can perform respective duties within respective operating areas, and give full play to respective resource advantages, thereby implementing the complementary advantages between the storage and retrieval equipment and the handling equipment, improving the picking efficiency, and ensuring incompatibility and balance between inventory picking efficiency and equipment costs.

The inventory system and method for implementing item picking provided in the embodiments of this application are used to partially resolve the problem in the related art of difficulty in improving warehouse handling efficiency and picking efficiency caused by a low driving speed of an aisle shuttle.

At least one of the above technical solutions employed in the embodiments of this application can achieve the following beneficial effects:

Through the inventory racks arranged in the warehouse, the space between the inventory racks is used as the first aisle, and the space that runs through the bottom floor of the inventory rack and where no first bottom-floor storage space is arranged on the bottom floor of the inventory rack is used as the second aisle, so that the storage and retrieval equipment and the handling equipment can be used together in the warehouse, which cooperate to transport items in the warehouse. In addition, the storage and retrieval equipment may drive in the first aisle and the handling equipment may drive in the first aisle and/or the second aisle. Since the handling equipment may drive in the bottom floor space of the inventory rack, a driving speed thereof is not affected by a height thereof. In addition, the aisle of the handling equipment may be different from that of the storage and retrieval equipment, so that driving of the storage and retrieval equipment and the handling equipment can be separated in this application. The cooperation of the handling equipment that can drive quickly and the storage and retrieval equipment that can transport from higher-floor storage spaces avoids the problems caused by the slow driving of the storage and retrieval equipment, and improves the warehouse handling efficiency and picking efficiency.

The foregoing summary of the invention is merely an overview of the technical solutions of this application. To understand the technical solutions of this application more clearly, implementation can be performed according to content of the specification. Moreover, to make the foregoing and other objectives, features, and advantages of this application more comprehensible, specific implementations of this application are described below.

BRIEF DESCRIPTION OF THE DRAWINGS

Other features, objectives, and advantages of this application become more obvious by reading the detailed description of non-limiting embodiments that is provided with reference to the following accompanying drawings. The accompanying drawings are merely used for illustrating the preferred implementations and are not intended to constitute a limitation on this application. Throughout the accompanying drawings, the same reference numerals are used to represent the same components. In the accompanying drawings:

FIG. 6-1 is another schematic front view of picking and placing a target inventory receptacle by a storage and retrieval equipment according to an embodiment of this application;

FIG. 6-2 is a schematic diagram of another inventory rack according to an embodiment of this application;

FIG. 7-1 and FIG. 7-2 are schematic structural diagrams of a jacking handling robot according to an embodiment of this application;

DETAILED DESCRIPTION

The example embodiments of this application are described in more detail below with reference to the accompanying drawings. Although the example embodiments of this application are shown in the accompanying drawings, it may be understood that the example embodiments described herein are only used to explain this application rather than limiting this application. Rather, these embodiments of this application are provided, so that this application is more thoroughly understood and the scope of this application is completely conveyed to a person skilled in the art. In addition, it should be further noted that, for ease of description, the accompanying drawings only show parts relevant to this application rather than the entire structure.

Before discussing the example embodiments in more detail, it should be mentioned that some of the example embodiments are described as processes or methods depicted as flowcharts. Although a flowchart depicts various operations (or steps) as a sequential process, many of the operations (or steps) may be performed in parallel, concurrently, or concurrently. Additionally, the order of operations may be rearranged. The process may be terminated when the operations are completed, but may alternatively have additional steps not included in the figures. The process may correspond to a method, a function, a procedure, a subroutine, a subprogram, and the like.

An inventory system and an inventory method provided in the embodiments of this application are described in detail below through the following embodiments and the optional solutions.

Figure 1:
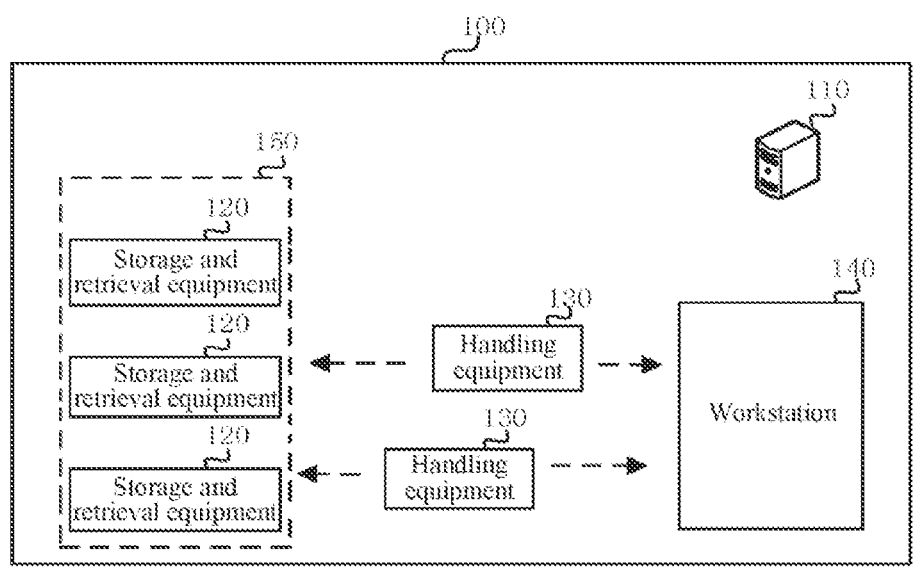
FIG. 1 is a structural block diagram of an inventory system according to an embodiment of this application.

FIG. 1 is a structural block diagram of an inventory system 100 according to an embodiment of this application. The technical solution of this embodiment is applicable to inventory receptacle picking in an inventory picking scenario. As shown in FIG. 1, the inventory system 100 provided in this embodiment of this application may include: a control system 110, a plurality of storage and retrieval equipments 120, and a plurality of handling equipments 130. The plurality of storage and retrieval equipments 120 and the plurality of handling equipments are respectively in communication with the control system 110, and the plurality of storage and retrieval equipments operate in a storage area 150 of the inventory system 100.

In an embodiment, the control system 110 is configured to: determine a target inventory receptacle from the inventory receptacles in the storage area 150; and respectively determine a target storage and retrieval equipment and a target handling equipment from the plurality of storage and retrieval equipments 120 and the plurality of handling equipments 130, and respectively send a dispatching instruction to the target storage and retrieval equipment and the target handling equipment.

In an embodiment, the storage and retrieval equipments 120 and the handling equipments 130 are configured to respectively drive to a target inventory receptacle in response to the dispatching instruction sent by the control system.

In an embodiment, the target storage and retrieval equipment 120 is configured to: drive, in response to the dispatching instruction sent by the control system 110, to a position specified in the dispatching instruction, take out the target inventory receptacle, and directly or indirectly undertake the target inventory receptacle to the target handling equipment.

In an embodiment, the target handling equipment 130 is configured to: drive, in response to the dispatching instruction sent by the control system 110, to a position specified in the dispatching instruction, undertake the target inventory receptacle, and transport the target inventory receptacle from the storage area to a workstation 140 specified in the dispatching instruction.

In an embodiment, the target storage and retrieval equipment is further configured to place the at least one taken-out target inventory receptacle at a preset transfer position.

In an embodiment, the target handling equipment is further configured to drive, in response to the dispatching instruction, to the transfer position to obtain the target inventory receptacle.

The transfer position may be a position in the storage area other than the inventory rack.

In an embodiment, optionally, the target storage and retrieval equipment is further configured to take out the at least one target inventory receptacle from a storage space of a first position of the inventory racks and place the target inventory receptacle in a storage space of a second position of the inventory racks, where the first position is higher than the second position.

In an embodiment, the target handling equipment is further configured to drive, in response to the dispatching instruction, to a position corresponding to the storage space of the second position, and obtain the target inventory receptacle.

The first position of the inventory rack may be, for example, the highest floor of the inventory rack, and the second position may be the lowest floor of the inventory rack. Taking a 5-floor inventory rack as an example, the first position may be one of the top two floors and the second position may be one of the bottom two floors.

In an embodiment, optionally, the target handling equipment is further configured to drive, in response to the dispatching instruction, to a preset position, where the preset position is adjacent to the position where the target storage and retrieval equipment takes out the target inventory receptacle; and the target storage and retrieval equipment is further configured to place the at least one taken-out target inventory receptacle on the target handling equipment.

The preset position is adjacent to the position where the target storage and retrieval equipment takes out the target inventory receptacle, so that the target storage and retrieval equipment places the target inventory receptacle at the preset position nearby after taking out the target inventory receptacle.

The preset position may be a position in the storage area other than the inventory rack.

In an embodiment, optionally, the handling equipment may be a conveying apparatus, and the target storage and retrieval equipment is further configured to place the at least one taken out target inventory receptacle on the target handling equipment.

In an embodiment, optionally, a height of the storage and retrieval equipment is greater than a height of the handling equipment. This makes it easier for the storage and retrieval equipment to place the taken-out target inventory receptacle.

In an embodiment, optionally, the position where the target storage and retrieval equipment takes out the target inventory receptacle and the specified workstation are located in different sub-areas.

For example, the target inventory receptacle is typically taken out in the storage area and then transported to the workstation by the handling equipment. The storage area and the workstation are generally located in different areas.

Figure 2:
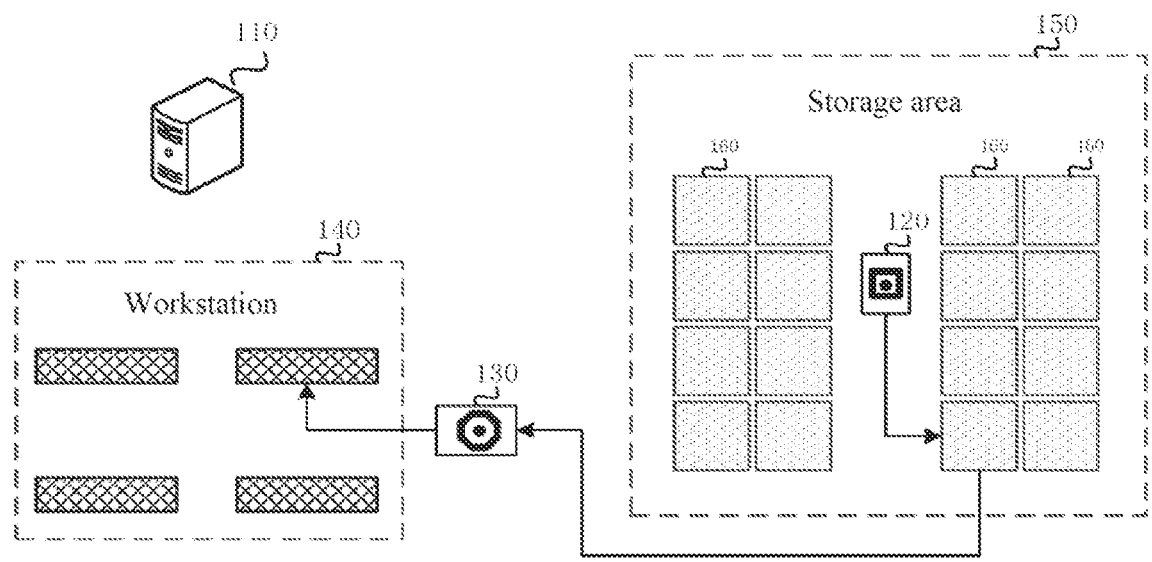
FIG. 2 is a schematic diagram of inventory picking based on a storage and retrieval equipment and a handling equipment according to an embodiment of this application.

In an embodiment, FIG. 2 is a schematic diagram of inventory picking based on a storage and retrieval equipment and a handling equipment according to an embodiment of this application. Referring to FIG. 2, the control system 110 may establish a communication connection with the plurality of storage and retrieval equipments 120 and the plurality of handling equipments 130 included in the inventory system respectively, to realize control and task dispatching of each storage and retrieval equipment 120 and each handling equipment 130, thereby ensuring that the storage and retrieval equipments 120 and the handling equipments 130 cooperate to perform an inventory picking operation. Optionally, the control system 110 refers to a software and/or hardware system with data information storage and data information processing capabilities, which can communicate with the storage and retrieval equipments 120, the handling equipments 130, and other hardware devices or software systems in the inventory system 100 in a wireless manner respectively. One or more control servers may be included in the control system 110. Optionally, the control system 110 may send dispatching tasks to the storage and retrieval equipments 120, the handling equipments 130, and other hardware devices or software systems in the inventory system 100, count the storage conditions of the inventory receptacles in the storage area, detect the operating status of the inventory system, transmit information to the staff, and the like.

In this embodiment, referring to FIG. 2, the control system 110 may determine, according to an order task, which inventory receptacles are inventory receptacles specified in the order task from the plurality of inventory receptacles in the storage area 150, and determine the inventory receptacles as target inventory receptacles. Optionally, a target inventory receptacle may be used to accommodate and store inventory items stored by the inventory system. For example, an inventory receptacle may be, for example, a storage receptacle or a material bin.

In this embodiment, referring to FIG. 2, the control system 110 may further select, according to distances between a target inventory receptacle and the storage and retrieval equipments 120 and the handling equipments 130 respectively and operating states of the storage and retrieval equipments 120 and the handling equipments 130, a target storage and retrieval equipment from the plurality of storage and retrieval equipments 120 and a target handling equipment from the plurality of handling equipments 130. Optionally, the target storage and retrieval equipment may be a storage and retrieval equipment closest to the target inventory receptacle and in an idle state, and the target handling equipment may be a handling equipment closest to the target inventory receptacle and in an idle state.

In this embodiment, referring to FIG. 2, the control system 110 may send a dispatching instruction to the target storage and retrieval equipment and the target handling equipment respectively, and the target storage and retrieval equipment and the target handling equipment may respectively move to the position of the target inventory receptacle according to the dispatching instruction. Optionally, the control system 110 may simultaneously dispatch the target storage and retrieval equipment and the target handling equipment to arrive at the position specified in the dispatching instruction at the same time, or a time interval before and after arriving at the position specified in the dispatching instruction is less than a preset time value. The advantage is that the synchronous dispatching of the storage and retrieval equipment and the handling equipment can be realized to ensure that the storage and retrieval equipment and the handling equipment reach the designated position at the same time as possible. The dispatching of the storage and retrieval equipment and the handling equipment is synchronized, which can prevent the handling equipment from reaching the target inventory receptacle prematurely or prevent the storage and retrieval equipment from reaching the target inventory receptacle prematurely, thereby preventing the target storage and retrieval equipment or the target handling equipment from waiting for the other party for a long time to cause the target handling equipment to be unable to give full play to a handling capacity thereof or cause the target storage and retrieval equipment to be unable to give full play to a storage and retrieval capability thereof.

In this embodiment, referring to FIG. 2, positioning identification marks are set on the ground in the storage area 150 of the inventory system. The target storage and retrieval equipment may perform positioning according to a map generated based on the positioning identification marks set on the ground of the storage area 150. In addition, the target storage and retrieval equipment may further drive to a positioning identification mark indicated in the dispatching instruction according to the map generated based on the positioning identification marks according to the dispatching instruction sent by the control system 110, thereby causing the target storage and retrieval equipment to move to the position of the target inventory receptacle. Similarly, the target handling equipment may also perform positioning according to a map generated based on the positioning identification marks set on the ground of the storage area 150. In addition, the target handling equipment may also drive to the same positioning identification mark indicated in the dispatching instruction according to the map generated based on the positioning identification marks according to the dispatching instruction sent by the control system 110, and then move the position of the target inventory receptacle. The foregoing positioning identification mark may specifically be a two-dimensional code positioning identification mark. In this way, the storage and retrieval equipment can quickly find the target inventory receptacle during the driving, reducing the storage and retrieval time and improving storage and retrieval efficiency. In addition, the handling equipment can quickly find the target inventory receptacle during the driving, reducing the handling time, improving the handling efficiency, and further improving the picking efficiency.

In this embodiment, referring to FIG. 2, a plurality of inventory racks 160 are deployed in the storage area 150 of the inventory system, each of the inventory racks 160 has a plurality of compartments, each of the compartments includes a plurality of storage spaces, and an inventory receptacle is placed on each of the storage spaces. In this way, the target inventory receptacle can be placed in a storage space of a corresponding inventory rack for storage. Optionally, the position specified in the dispatching instruction may be near the storage space of the inventory rack where the target inventory receptacle is located.

In this embodiment, still referring to FIG. 2, when the target storage and retrieval equipment drives to the inventory rack where the target inventory receptacle is located, the target storage and retrieval equipment may take out the target inventory receptacle specified in the order task from the storage space of the corresponding inventory rack. When the target handling equipment drives to the inventory rack where the target inventory receptacle is located, the target storage and retrieval equipment may directly or indirectly undertake the taken-out target inventory receptacle to the target handling equipment. The target handling equipment may undertake the target inventory receptacle, and transport the undertaken target inventory receptacle from the storage area to a workstation specified in the dispatching instruction for a picking operation. The inventory racks deployed in the storage area may be partition shelves, and the inventory receptacles may be box storage receptacles or material bins. The advantage is that the storage and retrieval equipment and the handling equipment can perform respective duties within respective operating areas, and give full play to respective resource advantages.

In this embodiment, still referring to FIG. 2, the storage and retrieval equipment can only operate in the storage area 150 of the inventory system, and the handling equipment 130 can drive between the storage area 150 and the workstation 140. The advantage of this arrangement is that the storage and retrieval equipment 120 and the handling equipment 130 can give full play to respective resource advantages in respective operating areas, and the storage and retrieval equipment 120 and the handling equipment 130 then cooperate to perform the inventory picking operation, thereby implementing the complementary advantages between the storage and retrieval equipment 120 and the handling equipment 130, and implementing incompatibility and balance between inventory picking efficiency and equipment costs.

In this embodiment, referring to FIG. 2, taking a picking scenario as an example, a picking receptacle, a picking display device, and a picking scanning device may be arranged at the workstation 140. After the target inventory receptacle is transported to the workstation 140, the staff may carry out the picking operation according to order task information prompted by the picking display device, pick an inventory item from the target inventory receptacle to a picking receptacle corresponding to the order task, and prompt the control system 110 to push a picking task of a next wave of order tasks after the current picking task is completed. Optionally, a robotic arm may be arranged at the workstation 140, and a picking scanning device may be installed on the robotic arm. The picking scanning device on the robotic arm may automatically scan and identify, and grab an inventory item that meets requirements of an order task from the target inventory receptacle and put the inventory item into the picking receptacle, which can improve the picking efficiency and reduce picking errors caused by manual picking.

It should be noted that, referring to FIG. 2, the foregoing storage and retrieval equipment 120 and handling equipment 130 are robots that can respectively implement different functional operations. The flexibility of the storage and retrieval equipment 120 is lower than the flexibility of the handling equipment 130. For example, a horizontal transport speed of the storage and retrieval equipment is lower than that of the handling equipment. The complexity of the operations implemented by the storage and retrieval equipment 120 is higher than the complexity of the operations implemented by the handling equipment 130. In addition, the increase in the complexity of the implemented operations increases the costs. That is, the storage and retrieval equipment 120 is suitable for performing functional operations with lower flexibility but higher complexity, while the handling equipment 130 is suitable for performing functional operations with higher flexibility but lower complexity. For example, the storage and retrieval equipment 120 is suitable for performing "taking out" and "placing" operations from the inventory receptacles, while the handling equipment 130 is suitable for performing "transporting" operations on results of the "taking out".

The inventory system is provided in the embodiments of this application. By adopting the technical solution of this application, it can be ensured that the storage and retrieval equipment gives full play to its initiative during the picking operation, without wasting a lot of time and handling resources in the horizontal handling operation. In this way, there is no need to arrange more storage and retrieval equipments to improve the picking efficiency, thereby reducing the equipment costs caused by the increase of storage and retrieval equipments. In addition, since the handling equipment has lower costs than the storage and retrieval equipment and higher flexibility than the storage and retrieval equipment, not only the equipment costs can be reduced, but also more horizontal handling costs can be reduced in the horizontal handling operation. As can be seen, by adopting the solution of this application, the storage and retrieval equipment and the handling equipment can perform respective duties within respective operating areas, and give full play to respective resource advantages, thereby implementing the complementary advantages between the storage and retrieval equipment and the handling equipment, improving the picking efficiency, and ensuring incompatibility and balance between inventory picking efficiency and equipment costs.

In an optional manner of this embodiment, this implementation may be combined with each optional solution in one or more of the foregoing embodiments. Referring to FIG. 1 and FIG. 2, in the inventory system of the solution of this application, the inventory system may further include: a warehouse management system (not shown in FIG. 1 and FIG. 2).

In an embodiment, the warehouse management system is configured to form and allocate production waves according to order requirements, and deliver order task information to the control system 110.

In an embodiment, the control system 110 is further configured to determine, at least according to the received order task information, a target inventory receptacle where an inventory item specified in the order task is located from the inventory receptacles deployed in the storage area 150.

In this implementation, the inventory system may further include an upper-level order system, and the upper-level order system may collect order requirement information, and deliver the order requirement information to the corresponding warehouse management system. the warehouse management system may form and allocate production waves according to order requirements. Further, the order task information may be deliver to the control system 110 according to production wave formation and allocation results. The order task information includes inventory items required in the order and basic information about the inventory items.

Figure 3:
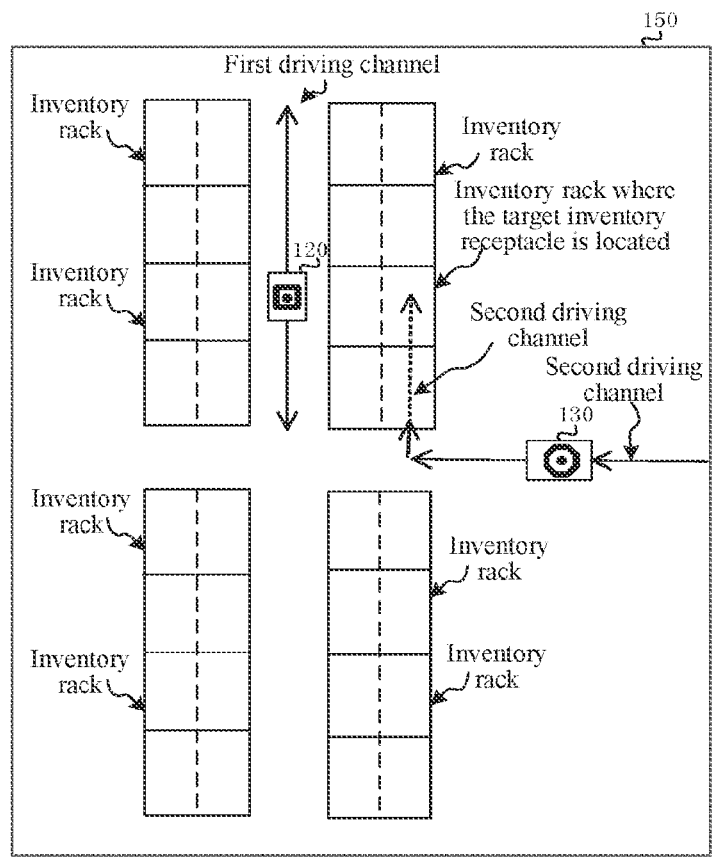
FIG. 3 is a schematic top view of dispatching a storage and retrieval equipment and a handling equipment according to an embodiment of this application.

In an optional manner of this embodiment, this implementation may be combined with each optional solution in one or more of the foregoing embodiments. FIG. 3 is a schematic top view of dispatching a storage and retrieval equipment and a handling equipment according to an embodiment of this application. Referring to FIG. 3, in the inventory system of this embodiments of this application, the target handling equipment is further configured to drive, in response to the dispatching instruction, to a bottom floor of an inventory rack where the target inventory receptacle is located that corresponds to a position where the target storage and retrieval equipment takes out the target inventory receptacle, and undertake the target inventory receptacle from the target storage and retrieval equipment.

Figure 4:
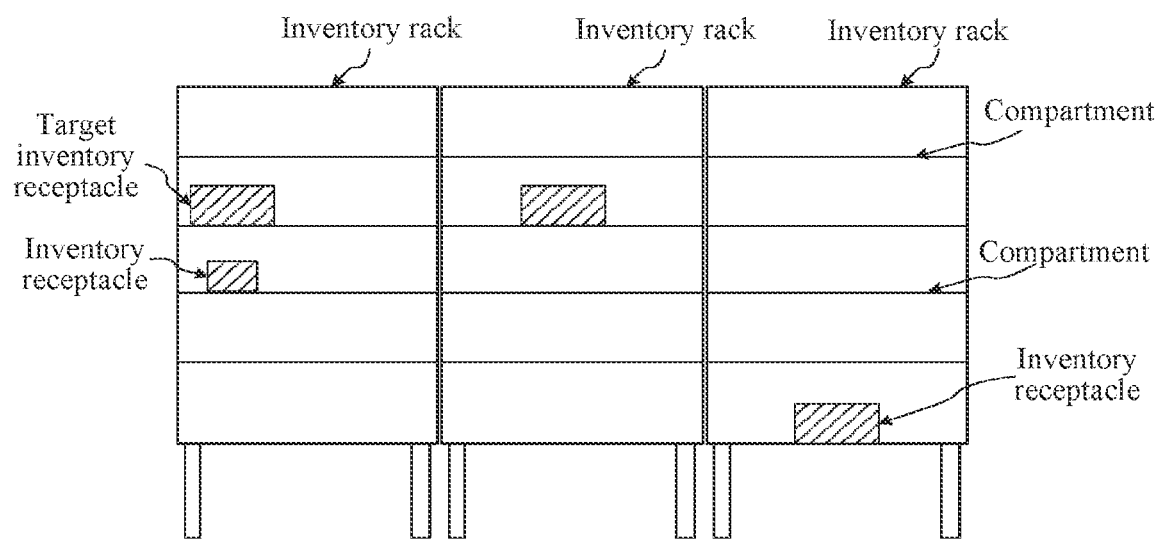
FIG. 4 is a schematic front view of an inventory rack group according to an embodiment of this application.

In this implementation, referring to FIG. 3, similar to shelves placed in a shopping mall, a large quantity of inventory racks may be arranged in the storage area 150, the plurality of inventory racks may be arranged into an inventory rack group, and inventory rack groups are arranged in an array form. For each inventory rack group, the inventory rack group may be formed by a plurality of rows of inventory racks with one column, may be formed by a plurality of rows of inventory racks with two columns, or may be formed by a plurality of rows of inventory racks with a plurality of columns. FIG. 4 is a schematic front view of an inventory rack group according to an embodiment of this application. referring to FIG. 4, taking the inventory rack being a partition shelf as an example, for each inventory rack, the inventory rack may include a plurality of compartments and four floor support columns. Each compartment of the inventory rack may include a plurality of storage spaces for direct placement of inventory receptacles.

In this embodiment, referring to FIG. 3 and FIG. 4, an accommodation height from the bottom surface of the inventory rack to the surface of the storage area may be preset to be greater than a transport height of the handling equipment when transporting the target inventory receptacle, to ensure that the target handling equipment can smoothly drive to the bottom floor of the inventory rack where the target inventory receptacle is located, to prevent the handling equipment from being stuck under the inventory rack and being unable to drive when transporting the target inventory receptacle. For example, taking the inventory rack being a partition shelf as an example, to ensure unobstructed movement under the inventory rack of the handling equipment without being stuck under the bottom of the inventory rack, the conventional partition shelf can be transformed. Specifically, a lower partition of the conventional partition shelf can be removed, to ensure that an accommodation height from the lowest partition of the partition shelf to the ground of the storage area is always greater than the transport height of the handling equipment when transporting the target inventory receptacle.

In this embodiment, referring to FIG. 3, a stop position when the target handling equipment drives to the bottom floor of the inventory rack where the target inventory receptacle is located needs to correspond to the position where the target storage and retrieval equipment takes out the target inventory receptacle. In this way, when the target storage and retrieval equipment allocates the target inventory receptacle to the target handling equipment, the target storage and retrieval equipment only needs to transport the taken-out target inventory receptacle in a top-down direction from the position where the target inventory receptacle is taken out, to directly or indirectly undertake, at the position where the target inventory receptacle is taken out, the target inventory receptacle to the target handling equipment below the bottom of the inventory rack. The advantage is that the horizontal handling operation on the target inventory receptacle by the target storage and retrieval equipment can be reduced, and it is ensured as possible that the storage and retrieval equipment does not drive horizontally when taking out the target inventory receptacle.

In an optional manner of this embodiment, this implementation may be combined with each optional solution in one or more of the foregoing embodiments. Referring to FIG. 3, in the inventory system of this embodiment of this application, the storage area 150 of the inventory system is provided with a first driving channel for the storage and retrieval equipment 120 and a second driving channel for the handling equipment 130.

In an embodiment, the target storage and retrieval equipment is further configured to drive to a preset position outside the inventory rack where the target inventory receptacle is located according to the first driving channel, where at least a part of the first driving channel is arranged in a gap between an access opening side of an inventory rack group where the target inventory receptacle is located and an adjacent inventory rack group.

In an embodiment, the target handling equipment is further configured to drive, according to the second driving channel, to a bottom floor of an inventory rack where the target inventory receptacle is located that corresponds to a position where the target storage and retrieval equipment takes out the target inventory receptacle, where at least a part of the second driving channel is arranged in space between the bottom of the inventory rack group where the target inventory receptacle is located and the surface of the storage area 150.

In an implementation, referring to FIG. 3 and FIG. 4, for each inventory rack, the inventory rack may be a partition shelf with a one-way access opening or a two-way access opening, and the first driving channel used by the target storage and retrieval equipment is located on a side of an access opening of the inventory rack where the target inventory receptacle is located. Optionally, in the same inventory rack group, each inventory rack has at least one access opening, so that the opening directions of the access openings of each inventory rack are consistent. On this basis, the foregoing first driving channel is arranged in the gap between the access opening side of the inventory rack group where the target inventory receptacle is located and the adjacent inventory rack group adjacent to the access opening side of the inventory rack group where the target inventory receptacle is located (since the first driving channel is not a channel for the storage and retrieval equipment to drive on the bottom floor of the inventory rack, the first driving channel can be seen in the schematic top view shown in FIG. 3, and is thus represented by a solid line).

In an optional example, referring to FIG. 4, one or more storage and retrieval equipments may operate on each first driving channel, and each storage and retrieval equipment can only operate on an associated first driving channel, so that each storage and retrieval equipment can only perform a storage and retrieval operation on each inventory receptacle in an inventory rack group on both sides of the associated first driving channel, but cannot perform the storage and retrieval operation on each inventory receptacle in an inventory rack group on both sides of another first driving channel. The advantage of this setting is that each storage and retrieval equipment can operate within a limited range, to prevent the storage and retrieval equipment from driving too much distance when performing the storage and retrieval operation to spend a long time in horizontal handling, thereby ensuring as possible that the operating time of the storage and retrieval equipment belongs to the storage and retrieval operation rather than the handling operation, and giving full play to the storage and retrieval capability of the storage and retrieval equipment. Optionally, if the gap of the first driving channel is too small for two storage and retrieval equipments 120 to drive side by side, the first driving channel may be divided to ensure that each storage and retrieval equipment on the same first driving channel only drives on a divided road section of the first driving channel, to avoid conflicts when two storage and retrieval equipments drive on the same first driving channel.

In this implementation, referring to FIG. 3, to ensure that there is no driving conflict between the handling equipment 130 and the storage and retrieval equipment 120, the second driving channel of the handling equipment 130 may be preset to avoid conflicts between the driving channels of the storage and retrieval equipment 120 and the handling equipment. Therefore, in this solution of this application, at least part of the second driving channel of the handling equipment is arranged in the space between the bottom of the inventory rack and the surface of the storage area below the bottom of the inventory rack. However, another part of the second driving channel may not be arranged below the bottom of the inventory rack, but arranged in the gap between the inventory rack group where the target inventory receptacle is located and other adjacent inventory rack groups, as long as it is ensured that the first driving channel and another part of the second driving channel do not overlap, to avoid conflicts between the first driving channel and the second driving channel (since the second driving channel is partially arranged below the bottom of the inventory rack, this part of the channel cannot be seen from a top view, and the second driving channel shown in FIG. 3 is divided into a solid-line part and a dashed-line part).

Figure 5:
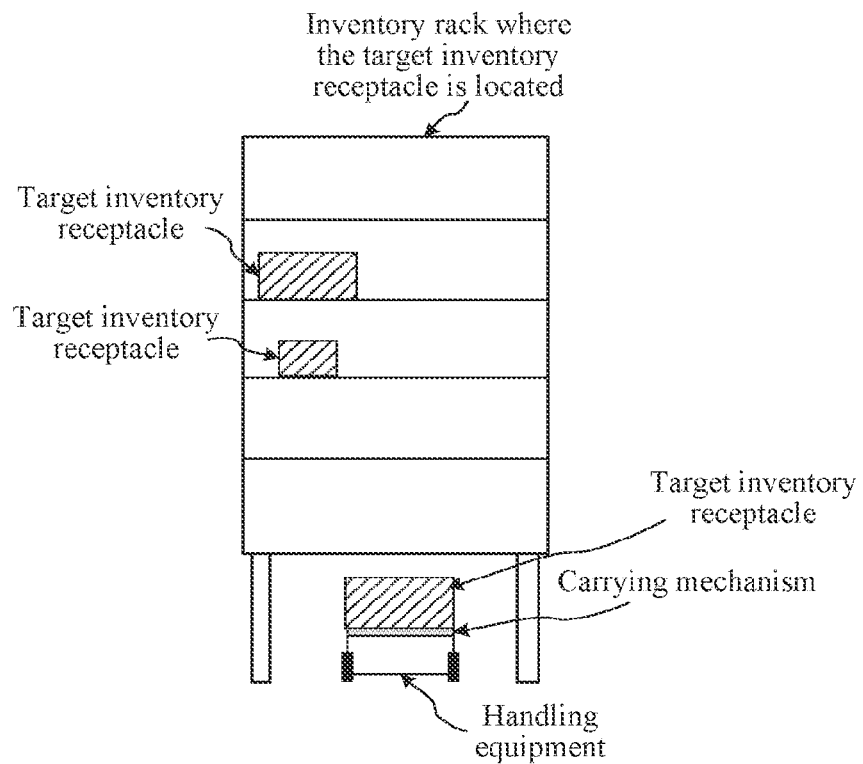
FIG. 5 is a schematic front view of picking and placing a target inventory receptacle by a storage and retrieval equipment according to an embodiment of this application.

In an optional manner of this embodiment, this implementation may be combined with each optional solution in one or more of the foregoing embodiments. FIG. 5 is a schematic front view of picking and placing a target inventory receptacle by a storage and retrieval equipment according to an embodiment of this application. Referring to FIG. 3 and FIG. 5, in the inventory system of this embodiment of this application, at least one carrying mechanism is arranged on the target handling equipment.

In an embodiment, the target storage and retrieval equipment is further configured to place the at least one taken-out target inventory receptacle on at least one carrying mechanism of the target handling equipment.

In an embodiment, the target handling equipment is further configured to undertake the at least target inventory receptacle through the at least one carrying mechanism.

In this implementation, referring to FIG. 3 and FIG. 5, when the target handling equipment drives to the bottom floor of the inventory rack where the target inventory receptacle is located, and a stop position thereof corresponds to the position where the target storage and retrieval equipment takes out the target inventory receptacle, the target storage and retrieval equipment only needs to place the taken-out target inventory receptacle on the carrying mechanism of the target handling equipment located below the bottom of the inventory rack where the target inventory receptacle is located, so that the target handling equipment can undertake and obtain, through the carrying mechanism, the target inventory receptacle taken out by the target storage and retrieval equipment.

In this implementation, optionally, it is necessary to set the stop position where the target handling equipment drives to the bottom floor of the inventory rack where the target inventory receptacle is located to be adjacent to the position where the target storage and retrieval equipment picks and places the target inventory receptacle, so that when the target storage and retrieval equipment picks up the target inventory receptacle from the inventory rack, the target storage and retrieval equipment does not need to move horizontally, but only needs to transport the taken-out target inventory receptacle from top to bottom, and directly place the taken-out target inventory receptacle on the carrying mechanism of the target handling equipment at the current position.

In this implementation, the carrying mechanism arranged on the target handling equipment has a transmission function. When the target storage and retrieval equipment places the taken-out target inventory receptacle on the carrying mechanism of the target handling equipment, the undertaken target inventory receptacle can be transmitted to a specific position on the carrying mechanism only by using the transmission function of the carrying mechanism. Optionally, the carrying mechanism of the handling equipment is a belt or a roller mechanism. Optionally, there may be two carrying mechanisms of the handling equipment, and the two carrying mechanisms are arranged horizontally or vertically.

In an optional example, the carrying mechanism of the handling equipment has a transmission power, and when detecting the target inventory receptacle pushed out by the target storage and retrieval equipment, the transmission function of the carrying mechanism may be activated to automatically transmit the target inventory receptacle to the specific position of the carrying mechanism. In another optional example, the carrying mechanism of the handling equipment does not have the transmission power, but the carrying mechanism may carry out the transmission with the help of a pushing force of the target storage and retrieval equipment when pushing out the target inventory receptacle. For example, in the process of placing the target inventory receptacle, with a moving operation of the storage and retrieval equipment when pushing the target inventory receptacle, the carrying mechanism on the handling equipment rotates synchronously with the push of the storage and retrieval equipment, which facilitates the smooth transition of the target inventory receptacle to the specific position of the carrying mechanism of the handling equipment.

Figures 1, 6:
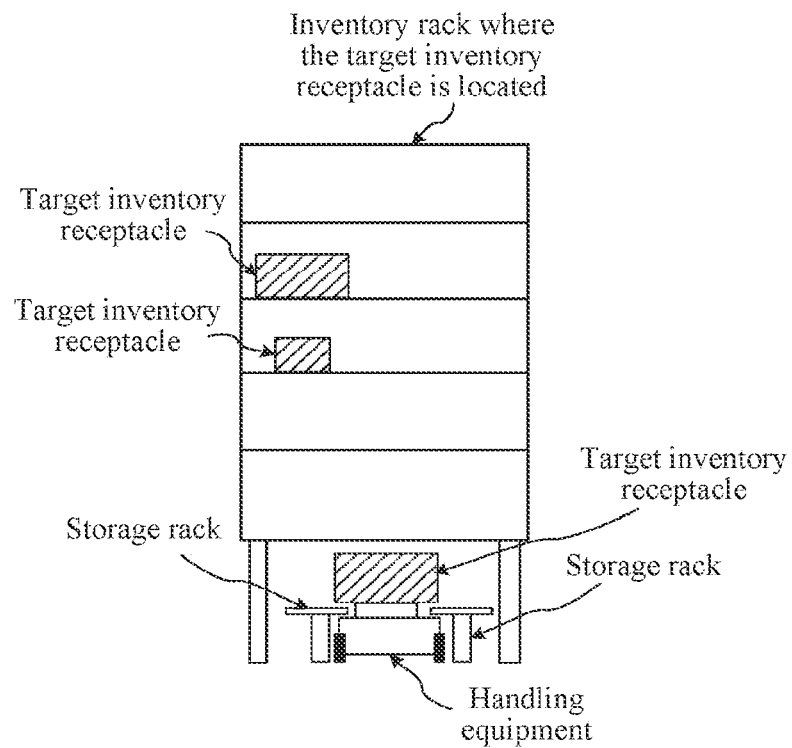
Figures 2, 6:
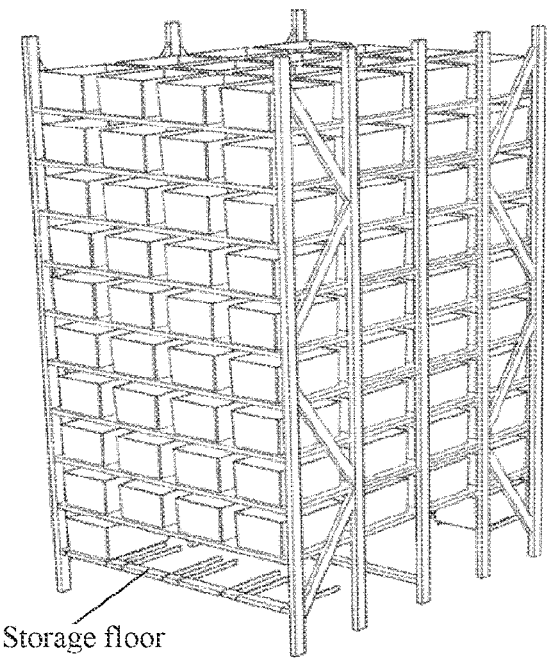

In another optional manner of this embodiment, this implementation may be combined with each optional solution in one or more of the foregoing embodiments. FIG. 6-1 is another schematic front view of picking and placing a target inventory receptacle by a storage and retrieval equipment according to an embodiment of this application. Referring to FIG. 6-1, in the inventory system of this embodiment of this application, a bottom floor of each inventory rack is provided with a storage rack.

In an embodiment, the target storage and retrieval equipment is further configured to place the taken-out target inventory receptacle on a storage rack below a bottom floor of a target inventory rack.

In an embodiment, the target handling equipment is further configured to undertake and obtain the target inventory receptacle placed on the storage rack.

In an implementation, referring to FIG. 6-1, the storage rack is arranged at a preset position below the bottom of the target inventory rack, and the preset position needs to ensure that the position of the storage and retrieval equipment is adjacent to the position of the storage rack, so that when the storage and retrieval equipment takes out the target inventory receptacle from the target inventory rack, the target storage and retrieval equipment does not need to move horizontally, but only needs to transport the taken-out target inventory receptacle from top to bottom, and directly place the taken-out target inventory receptacle on the storage rack. The advantage of using the foregoing storage rack is that the storage and retrieval equipment does not need to wait for the handling equipment to be in place, and only needs to directly place the taken-out target inventory receptacle on the storage rack to perform the next taking-out task, thereby reducing a lot of time for performing the taking-out operation, and fully ensuring that the storage and retrieval equipment can be in the process of performing the taking-out operation without wasting more time picking and placing the same target inventory receptacle. Optionally, the bottom floor of the inventory rack is provided with the position of the storage rack, which corresponds to the position where the target storage and retrieval equipment takes out the target inventory receptacle, and is as close as possible. The advantage of setting the position of the storage rack is that after taking out the target inventory receptacle, the target storage and retrieval equipment only needs to place the target inventory receptacle on the storage rack below the bottom of the inventory rack at the current position without the need for horizontal movement, avoid wasting time on horizontal handling.

Figures 1, 7:
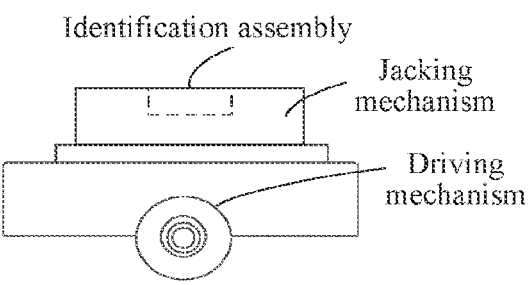
Figures 2, 7:
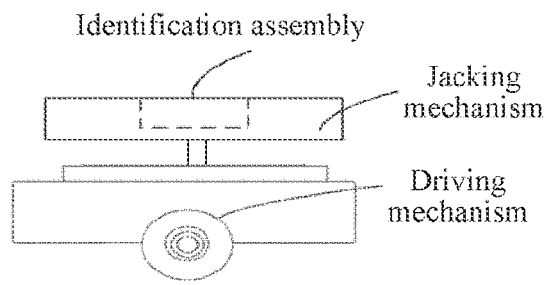

In an implementation, referring to FIG. 6-2, the target handling equipment is provided with a jacking mechanism. The handling equipment is further configured to drive to be below the storage rack and use the jacking mechanism to lift and obtain the target inventory receptacle placed above the storage rack. The handling equipment may then transport the obtained target inventory receptacle to the workstation to complete the inventory picking operation. The handling equipment may be a handling robot for transporting the target inventory receptacle. FIG. 7-1 and FIG. 7-2 are schematic structural diagrams of a jacking handling robot according to an embodiment of this application. FIG. 7-2 shows a state of the jacking mechanism when being raised. Referring to FIG. 7-1 and FIG. 7-2, the handling robot may include a driving mechanism through which the handling robot can move within operating space. The handling robot may further include a jacking mechanism for transporting the target inventory receptacle, the handling robot may move to be below the storage rack, and the handling robot may use the jacking mechanism to lift the target inventory receptacle placed on the storage rack and carry the target inventory receptacle to a picking workstation. When the jacking mechanism is raised, the entire target inventory receptacle is lifted from the storage rack, so that the handling robot can transport the target inventory receptacle. When the jacking mechanism is lowered, the target inventory receptacle is placed on the entire handling robot. Optionally, the handling robot may further include a target identification assembly, through which the target inventory receptacle can be effectively identified and aligned when the handling robot lifts the target inventory receptacle.

In this implementation, referring to FIG. 6-1, the upper part and the lower part of the storage rack are arranged in communication, and at least one opening is provided at the lower part of the storage rack for the handling equipment to enter below the storage rack. The upper part and the lower part of the storage rack are arranged in communication, to facilitate the handling robot to lift and transport, below the storage rack, the target inventory receptacle located above the storage rack. At least one opening is provided below the storage rack, to facilitate the handling equipment to enter the storage rack from below, lift the obtained target inventory receptacle, and leave from below the storage rack. Based on the foregoing arrangement of the storage rack, it can be fully ensured that the handling equipment can obtain the target inventory receptacle from the bottom of the inventory rack and transport the target inventory receptacle horizontally, to avoid conflicts with the driving path of the storage and retrieval equipment. Optionally, an opening direction of the at least one opening provided below the storage rack is consistent with the direction of the access opening of the inventory rack, so that the handling equipment can drive from the opening of the storage rack into the space below the bottom of the storage rack according to the second driving channel.

It should be noted that, referring to the handling solution of the handling equipment shown in FIG. 5 and FIG. 6-1, the handling equipment shown in FIG. 5 is provided with a carrying mechanism with a transmission function. When the storage and retrieval equipment is docked with the handling equipment, the undertaken target inventory receptacle can be transmitted to a specific position through the transmission function of the carrying mechanism. Different from the handling solution of the handling equipment shown in FIG. 5, the handling equipment shown in FIG. 6-1 is not provided with a carrying mechanism with a transmission function, but is provided with a jacking mechanism. The target inventory receptacle placed on the storage rack may be lifted by the jacking mechanism. In addition, the handling equipment shown in FIG. 5 is the same as the handling solution of the handling equipment shown in FIG. 6 in that both equipments may be provided with a driving mechanism through which the handling equipments can move in operating space. In addition, a target identification assembly may be further provided, through which the target inventory receptacle can be effectively identified and aligned.

FIG. 6-2 is a schematic diagram of another inventory rack according to an embodiment of this application. In this embodiment, a bottommost compartment of the inventory rack is used as a storage floor. This embodiment takes back-to-back arrangement of two shelves as an example for schematic illustration, but the specific arrangement of the inventory racks is not limited in this embodiment of this application.

In this embodiment of this application, the upper part and the lower part of the storage floor of the inventory rack are arranged in communication, and at least one opening is provided at the lower part of the storage floor for the handling equipment to enter below the storage floor. The upper part and the lower part of the storage floor are arranged in communication, to facilitate the handling robot to lift and transport, below the storage floor, the target inventory receptacle located above the storage floor. At least one opening is provided below the storage floor, to facilitate the handling equipment to enter the storage floor from below, lift the obtained target inventory receptacle, and leave from below the storage floor. Based on the foregoing arrangement of the storage floor, it can be fully ensured that the handling equipment can obtain the target inventory receptacle from the bottom of the inventory rack and transport the target inventory receptacle horizontally, to avoid conflicts with the driving path of the storage and retrieval equipment. Optionally, an opening direction of the at least one opening provided below the storage floor is consistent with the direction of the access opening of the inventory rack, so that the handling equipment can drive from the opening of the storage floor into the space below the bottom of the storage floor according to the second driving channel.

In this embodiment, the target handling equipment may respond to a dispatching instruction, and the target storage and retrieval equipment may place the taken-out target inventory receptacle on the bottommost compartment of the storage floor.

In this embodiment, the target handling equipment may drive to be below a bottommost compartment of an inventory rack where the target inventory receptacle is located or to an aisle where the target storage and retrieval equipment takes out the target inventory receptacle, and undertake the inventory receptacle from the bottommost compartment of the storage floor.

In an optional manner of this embodiment, this implementation may be combined with each optional solution in one or more of the foregoing embodiments. Referring to FIG. 4, in the inventory system of this embodiment of this application, each storage space of the target inventory rack carries a storage space identification mark for the storage and retrieval equipments to identify and align a storage space where the target inventory receptacle is located.

In this implementation, taking the partition shelf shown in FIG. 4 being an inventory rack as an example, a storage space identification mark may be set in each storage space of the inventory rack. Basic information of an inventory receptacle in the storage space on the inventory rack and storage information of the inventory receptacle may be recorded in the storage space identification mark. For example, the storage information may include information such as a type and a quantity of target inventory items placed on the inventory receptacle. In addition, a rack identification mark for identifying an identity of the inventory rack may be set at a preset position of each inventory rack. For example, a rack identification mark may be set on a partition beam of partition shelf. Optionally, the foregoing storage space identification mark and rack identification mark may be in any information recording form such as a two-dimensional code, a barcode, and an RFID tag.

In this implementation, optionally, the control system may inform the storage and retrieval equipment of a height of the target inventory receptacle on the inventory rack. When the target storage and retrieval equipment drives to the inventory rack where the target inventory receptacle is located, the target storage and retrieval equipment may elevate a camera thereof to the height corresponding to the target inventory receptacle, scan the storage space identification mark on the storage space where the target inventory receptacle is located, and check whether the found inventory receptacle is the target inventory receptacle.

In an optional manner of this embodiment, this implementation may be combined with each optional solution in one or more of the foregoing embodiments. Referring to FIG. 4, in the inventory system of this embodiment of this application, the target inventory receptacle carries a receptacle identification mark for the storage and retrieval equipments to identify and align the target inventory receptacle.

In this implementation, an inventory receptacle is placed on each inventory rack shown in FIG. 4, and a receptacle identification mark for identifying the identity of the inventory receptacle may be set at a preset position of the inventory receptacle. For example, taking an inventory receptacle as an example, a receptacle identification mark may be set at a side of the inventory receptacle. The receptacle identification mark may record information about inventory items contained in the inventory receptacle and basic information of the inventory receptacle. Optionally, the receptacle identification mark may be in any information recording form such as a two-dimensional code, a barcode, and an RFID tag. Optionally, the setting position of the receptacle identification mark on the inventory receptacle may be set according to a relative placement position of the inventory receptacle on the inventory rack, which can ensure that the storage and retrieval equipment can quickly find a receptacle identification mark carried on each inventory receptacle to identify whether an inventory receptacle is a target inventory receptacle required for an order task. The time for picking and placing the target inventory receptacle by the storage and retrieval equipment can be reduced to a certain extent, thereby improving the storage and retrieval efficiency, and further improving the picking efficiency.

In an optional manner of this embodiment, this implementation may be combined with each optional solution in one or more of the foregoing embodiments. In the inventory system of this embodiment of this application, a receptacle storage and retrieval assembly is arranged on each of the storage and retrieval equipments, and an inventory receptacle is taken out from an inventory rack through a receptacle storage and retrieval assembly.

In this implementation, the storage and retrieval equipment includes a receptacle storage and retrieval assembly. The target inventory receptacle can be taken out from the inventory rack where the target inventory receptacle is located through the receptacle storage and retrieval assembly, and can be directly or indirectly undertaken to the target handling equipment through the receptacle storage and retrieval assembly. Moreover, the storage and retrieval equipment further includes a lifting assembly, which can lift and/or lower the receptacle storage and retrieval assembly to a preset height. The storage and retrieval equipment may adjust the height of the receptacle storage and retrieval assembly through the lifting assembly, so that the storage and retrieval assembly can perform the storage and retrieval operation at any height of the inventory rack. In this way, the storage and retrieval equipment may transport the taken-out target inventory receptacle from top to bottom, so that the target inventory receptacle can be undertaken to the handling equipment at the current position, without the need to perform an unskillful horizontal handling operation to waste a lot of time in the horizontal handling process, thereby further improving the picking efficiency.

Figure 8:
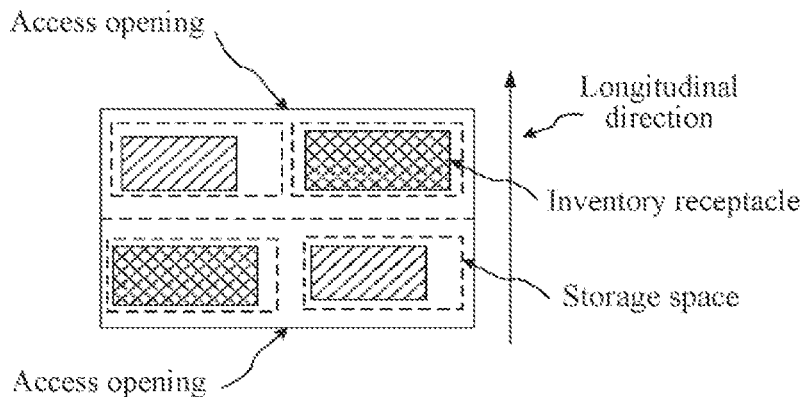
FIG. 8 is a schematic diagram of placement of a compartment of an inventory receptacle according to an embodiment of this application.

In an optional manner of this embodiment, this implementation may be combined with each optional solution in one or more of the foregoing embodiments. FIG. 8 is a schematic diagram of placement of a compartment of an inventory receptacle according to an embodiment of this application. Referring to FIG. 8, in the inventory system of this embodiment of this application, each compartment of each of the inventory racks has at least one storage space in a longitudinal direction for placing at least one inventory receptacle.

In this implementation, referring to FIG. 4 and FIG. 8, taking the inventory rack being a partition shelf as an example, the shelf may be a two-way access opening shelf. Along a longitudinal direction of compartments of the partition shelf, two storage spaces may be included. Two inventory receptacles may be sequentially placed in the two storage spaces, that is, an inventory receptacle is placed in a direction of each access opening. To save space in the storage area, two inventory racks may be spliced along the longitudinal direction of the compartments. In this case, for each inventory rack after splicing, there is only one access opening in each compartment of each inventory rack that allows inventory receptacles to enter and exit the compartments of the inventory racks. Referring to FIG. 5, the partition shelf may be alternatively a one-way access opening shelf, but two storage spaces may be sequentially set along the longitudinal direction of the compartments of the partition shelf, and two inventory receptacles may be sequentially placed along the longitudinal direction in the two storage spaces. That is, two inventory receptacles may be sequentially put into the storage spaces of the compartments from the same access opening in the longitudinal direction. The longitudinal direction may be a direction from the first driving channel as a starting point to the access opening of the inventory rack.

In an optional manner of this embodiment, this implementation may be combined with each optional solution in one or more of the foregoing embodiments. In the inventory system of this embodiment of this application, a temporary storage rack is further arranged on each of the storage and retrieval equipments, each temporary storage rack has a plurality of compartments, and each compartment includes at least one storage space.

In this implementation, optionally, the target inventory receptacle is located in a rear row of a compartment where the target inventory receptacle is located sequentially in a longitudinal direction. On this basis, the target storage and retrieval equipment is further configured to directly take out the target inventory receptacle if there is no other inventory receptacle in a front row of the target inventory receptacle. The target storage and retrieval equipment is further configured to sequentially take out, if there is at least one inventory receptacle in the front row of the target inventory receptacle that blocks the target inventory receptacle, the at least one inventory receptacle in the front row, sequentially place the at least one inventory receptacle in the at least one storage space of the temporary storage racks, take out the target inventory receptacle, place the target inventory receptacle in a storage space of the temporary storage racks, and returning the at least one inventory receptacle in the front row to the inventory racks.

In this implementation, optionally, if two inventory receptacles are sequentially placed along the longitudinal direction in each compartment of the inventory rack, the storage and retrieval equipment in this solution of this application may be a double-extension robot. In this case, through the storage and retrieval assembly arranged on the storage and retrieval equipment, both inventory receptacles near the outside of the compartments can be picked, but also inventory receptacles inside the compartments can be picked. In addition, if only one inventory receptacle is placed along the longitudinal direction in each compartment of the inventory rack, the storage and retrieval equipment in this solution of this application may be a single-extension robot. In this case, through the storage and retrieval assembly arranged on the storage and retrieval equipment, inventory receptacles near the outside of the compartments can be picked.

Figure 9:
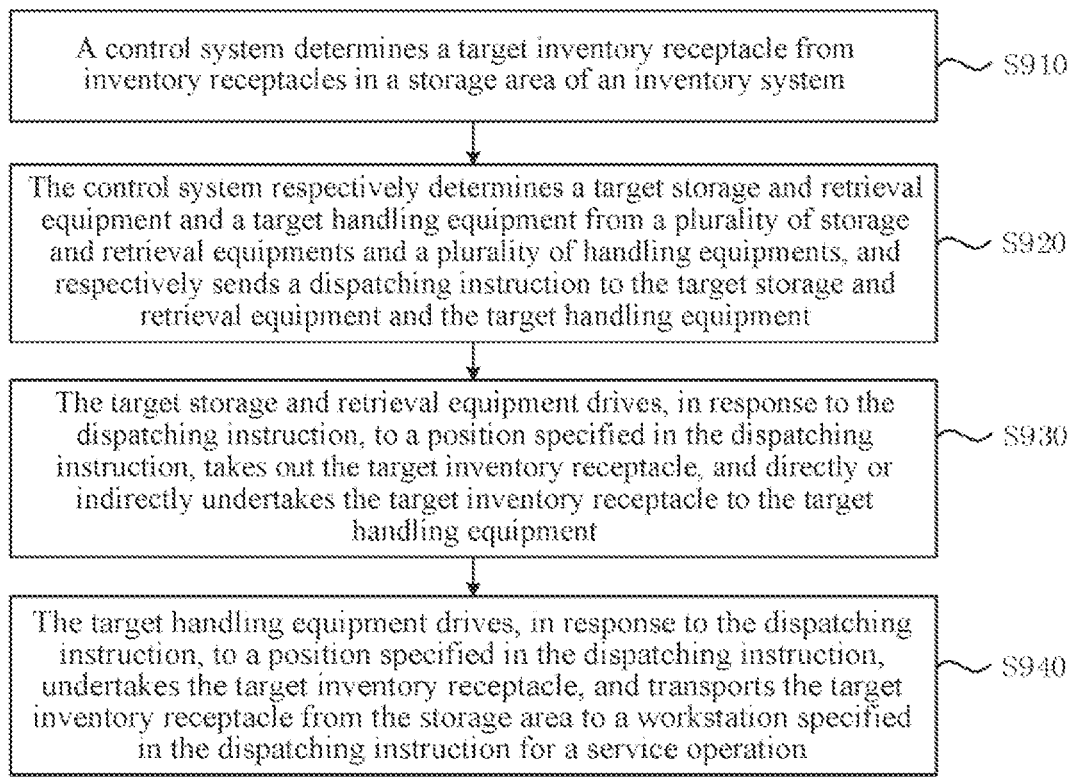
FIG. 9 is a flowchart of an inventory method according to an embodiment of this application.
Figure 10:
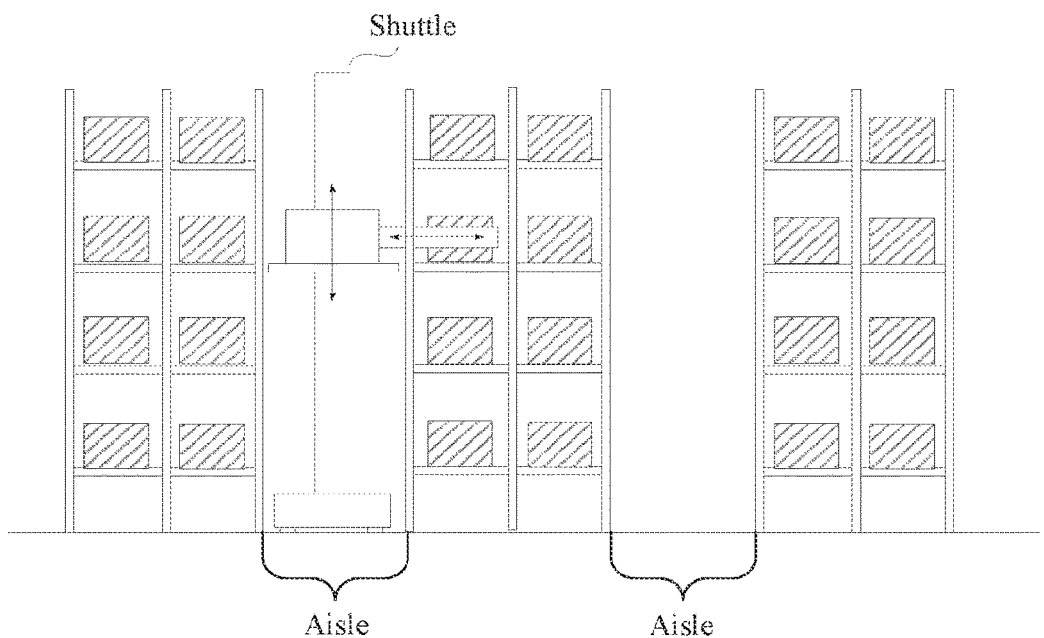
FIG. 10 is a schematic diagram of using an aisle shuttle in an existing warehouse.

FIG. 9 is a flowchart of an inventory method according to an embodiment of this application. The technical solution of this embodiment is applicable to inventory picking in an inventory picking scenario. The method is applicable to the inventory system provided in any embodiment of this application.

As shown in FIG. 9, the inventory method provided in this embodiment of this application may include the following steps:

S910: A control system determines a target inventory receptacle from inventory receptacles in a storage area of an inventory system.

S920: The control system respectively determines a target storage and retrieval equipment and a target handling equipment from a plurality of storage and retrieval equipments and a plurality of handling equipments, and respectively sends a dispatching instruction to the target storage and retrieval equipment and the target handling equipment, where the plurality of storage and retrieval equipments and the plurality of handling equipments are respectively in communication with the control system, the plurality of storage and retrieval equipments operate in the storage area, a plurality of inventory racks are deployed in the storage area, each of the inventory racks has a plurality of compartments, each of the compartments includes a plurality of storage spaces, and an inventory receptacle is placed on each of the storage spaces.

S930: The target storage and retrieval equipment drives, in response to the dispatching instruction, to a position specified in the dispatching instruction, takes out the target inventory receptacle, and directly or indirectly undertakes the target inventory receptacle to the target handling equipment.

S940: The target handling equipment drives, in response to the dispatching instruction, to a position specified in the dispatching instruction, undertakes the target inventory receptacle, and transports the target inventory receptacle from the storage area to a workstation specified in the dispatching instruction for a service operation.

Based on the foregoing embodiments, optionally, the driving, by the target handling equipment in response to the dispatching instruction, to a position specified in the dispatching instruction, and undertaking the target inventory receptacle includes:

driving, by the target handling equipment in response to the dispatching instruction, to a bottom floor of an inventory rack where the target inventory receptacle is located that corresponds to a position where the target storage and retrieval equipment takes out the target inventory receptacle, and undertaking the target inventory receptacle from the target storage and retrieval equipment.

Based on the foregoing embodiments, optionally, the directly or indirectly undertaking the target inventory receptacle to the target handling equipment includes:

placing, by the target storage and retrieval equipment, the at least one taken-out target inventory receptacle on at least one carrying mechanism of the target handling equipment; and correspondingly, the undertaking, by the target handling equipment, the target inventory receptacle includes:

undertaking, by the target handling equipment, the at least target inventory receptacle through the at least one carrying mechanism.

Based on the foregoing embodiments, optionally, after the undertaking, by the target handling equipment, the target inventory receptacle, the method further includes:

transmitting, by the target handling equipment using a transmission function of the carrying mechanism, the undertaken target inventory receptacle to a specific position on the carrying mechanism.

Based on the foregoing embodiments, optionally, the carrying mechanism is a belt or a roller mechanism.

Based on the foregoing embodiments, optionally, there are two carrying mechanisms, and the two carrying mechanisms are arranged horizontally or vertically.

Based on the foregoing embodiments, optionally, each storage space of each of the inventory racks carries a storage space identification mark for the storage and retrieval equipments to identify and align a storage space where the target inventory receptacle is located.

Based on the foregoing embodiments, optionally, each of the inventory receptacles carries a receptacle identification mark for the storage and retrieval equipments to identify and align the target inventory receptacle.

Based on the foregoing embodiments, optionally, the directly or indirectly undertaking the target inventory receptacle to the target handling equipment includes:

placing, by the target storage and retrieval equipment, the taken-out target inventory receptacle on a storage rack, the storage rack being arranged on a bottom floor of the inventory rack; and correspondingly, the undertaking, by the target handling equipment, the target inventory receptacle includes:

undertaking, by the target handling equipment, the inventory receptacle from the storage rack.

Based on the foregoing embodiments, optionally, the undertaking, by the target handling equipment, the inventory receptacle from the storage rack includes:

driving, by the target handling equipment, to be below the storage rack, and undertaking and lifting the target inventory receptacle placed on the storage rack by using a jacking mechanism arranged on the target handling equipment.

Based on the foregoing embodiments, optionally, each compartment of each of the inventory racks has at least one storage space in a longitudinal direction for placing at least one inventory receptacle.

Based on the foregoing embodiments, optionally, a receptacle storage and retrieval assembly is arranged on each of the storage and retrieval equipments, and an inventory receptacle is taken out from an inventory rack through a receptacle storage and retrieval assembly.

Based on the foregoing embodiments, optionally, a temporary storage rack is further arranged on each of the storage and retrieval equipments, each temporary storage rack has a plurality of compartments, and each compartment includes at least one storage space.

Based on the foregoing embodiments, optionally, the target inventory receptacle is located in a rear row of a compartment where the target inventory receptacle is located in a longitudinal direction; and the driving, by the target storage and retrieval equipment, to a position specified in the dispatching instruction, and taking out the target inventory receptacle includes:

directly taking out, by the target storage and retrieval equipment, the target inventory receptacle if there is no other inventory receptacle in a front row of the target inventory receptacle; or sequentially taking out, by the target storage and retrieval equipment if there is at least one inventory receptacle in the front row of the target inventory receptacle that blocks the target inventory receptacle, the at least one inventory receptacle in the front row, sequentially placing the at least one inventory receptacle in the at least one storage space of the temporary storage racks, taking out the target inventory receptacle, placing the target inventory receptacle in a storage space of the temporary storage racks, and returning the at least one inventory receptacle in the front row to the inventory racks.

The inventory method provided in this embodiment of this application may be applied to the inventory system provided in any of the foregoing embodiments of this application, and has the corresponding functions and beneficial effects of the inventory system. For technical details that are not described in detail in the foregoing embodiments, specific reference may be made to the inventory system provided in any embodiment of this application.

Figure 11:
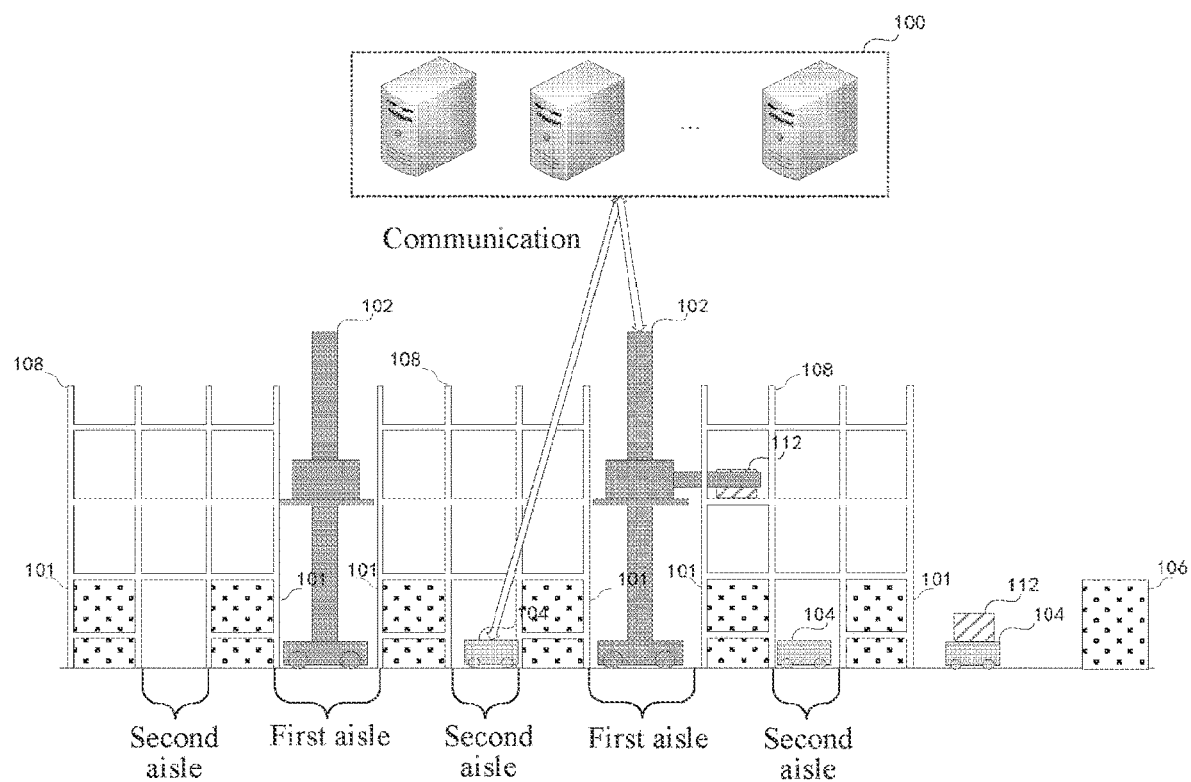
FIG. 11 is a schematic diagram of an inventory system according to an embodiment of this application.

FIG. 11 is a schematic diagram of an inventory system according to an embodiment of this application. The system is configured to implement the picking and handling of items in a warehouse. The system includes: one or more control systems 100, one or more storage and retrieval equipments 102, one or more handling equipments 104, and one or more destinations 106. The warehouse using the system for handling and dispatching is formed by at least one inventory rack 108. Each inventory rack 108 in the warehouse is provided with a plurality of floors. The control systems 100 are in communication with the storage and retrieval equipments 102 and the handling equipments 104 respectively.

In one or more embodiments of this application, the destination 106 in the warehouse may be a position of a rack for temporarily storing inventory receptacles in the warehouse, or a position of a rack for storing inventory receptacles, or a position of a picking station in the warehouse, or a position of an outbound connection point, or the like, which is not limited in this application. For ease of description, the destination 106 being an outbound connection point is taken as an example for description below.

In addition, space between inventory racks 108 in the warehouse forms a first aisle, and each floor of the inventory rack 108 is provided with at least two storage spaces in the longitudinal direction. In this application, the longitudinal direction of the inventory rack 108 refers to a direction from a storage space adjacent to the first aisle in the inventory rack 108 to a storage space not adjacent to the first aisle. The schematic diagram shown in FIG. 11 is a cross-sectional view. As can be seen, three storage spaces are set in the longitudinal direction of each shelf.

Figure 12:
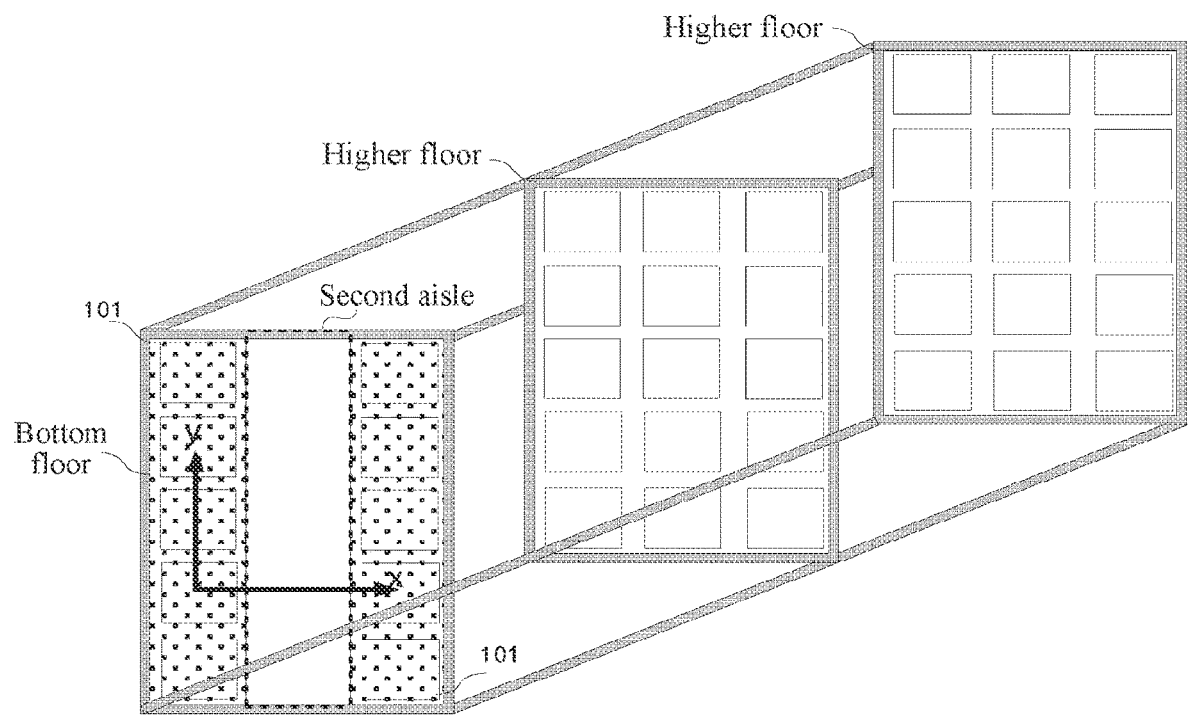
FIG. 12 is a schematic top view of a three-dimensional warehouse according to an embodiment of this application.

FIG. 12 is a top view of an inventory rack according to this application. For ease of understanding, FIG. 3 shows the bottom floor and several higher floors of the inventory rack 108 respectively. In FIG. 12, arrows indicate longitudinal directions of the inventory rack 108. As can be seen, in the longitudinal direction of the x-axis, the inventory rack 108 is provided with three storage spaces, and in the longitudinal direction of the y-axis, the inventory rack 108 is provided with five storage spaces.

In addition, in this application, a row of first bottom-floor storage spaces 101 are arranged on a bottom floor of at least one side of the inventory rack 108 adjacent to the first aisle, as shown in FIG. 11 and FIG. 12. High-floor storage spaces are arranged on higher floors of the inventory rack 108. During operation of the warehouse, at least some of the first bottom-floor storage spaces 101 on the bottom floor of the inventory rack 108 are provided with inventory receptacles, and at least some of higher-floor storage spaces on higher floors other than the bottom floor of the inventory rack 108 are provided with inventory receptacles.

In one or more embodiments provided in this application, space where no first bottom-floor storage space 101 is arranged on the bottom floor of the inventory rack 108 forms a second aisle, and the second aisle is used for the handling equipment 104 to drive. Therefore, the bottom floor of the inventory rack 108 needs to be arranged in communication. As shown in FIG. 11 and FIG. 12, an area circled by a dotted line in FIG. 12 is the second aisle in the bottom floor of the inventory rack 108.

FIG. 12 is a schematic diagram of one example form of an inventory rack. The first bottom-floor storage space 101 is arranged on a long side of a rectangle projected with the inventory rack 108, that is, in the y-axis direction. Therefore, for the second aisle to run through the bottom floor of the inventory rack 108, the second aisle is also in the y-axis direction. The first bottom-floor storage space 101 may be alternatively arranged on a short side of the rectangle projected with the inventory rack 108, that is, in the x-axis direction. Therefore, the second aisle may also be in the x-axis direction. Since the second aisle is formed by the space where no first bottom-floor storage space 101 is arranged, how to arrange the first bottom-floor storage space 101 determines the possible position of the second aisle, and the arrangement may be determined as required.

In one or more embodiments provided in this application, the control system 100 may specifically be a warehouse server, which is configured to determine a storage space where an item is placed after entering the warehouse, a destination 106 to which the item in the warehouse needs to be transported when exiting the warehouse, and determine handling tasks, and the like. Since how to determine the storage space of the item entering the warehouse, the destination 106 of the item exiting the warehouse, and the generation of handling tasks are all tasks that a server of a smart warehouse needs to perform at present, and there are relatively mature solutions, a process of determining a handling task by the control system 100 is not limited in this application.

In one or more embodiments provided in this application, there may be one or more control systems 100. For ease of description, one control system 100 is taken as an example for description below.

The control system 100 is configured to determine, according to a handling task, a storage and retrieval equipment 102 and/or a handling equipment 104 that performs the handling task, and respectively send a handling instruction for performing the handling task to the determined storage and retrieval equipment 102 and handling equipment 104. Since the handling instruction is used for instructing the storage and retrieval equipment 102 or the handling equipment 104 to transport the target inventory receptacle 112 to the storage space or the destination 106, the handling instruction needs to include at least a starting position and an end position where the target inventory receptacle 112 is transported. In addition, the handling instruction may further include a handling path, or if the storage and retrieval equipment 102 and the handling equipment 104 may adaptively plan paths and navigate, the control system 100 is not responsible for path planning, and the handling instruction may not include the handling path.

In one or more embodiments provided in this application, the storage and retrieval equipment 102 in the system drives in the first aisle and is configured to take out, according to the handling instruction sent by the control system 100, a target inventory receptacle 112 indicated in the handling instruction from a higher-floor storage space of the inventory rack 108 and put the target inventory receptacle in an idle first bottom-floor storage space 101, or take out the target inventory receptacle 112 indicated in the handling instruction from the first bottom-floor storage space 101 and put the target inventory receptacle in the higher-floor storage space 101.

In one or more embodiments provided in this application, the handling equipment 104 in the system drives in the first aisle and/or the second aisle, and is configured to take out, according to the handling instruction sent by the control system 100, the target inventory receptacle 112 indicated in the handling instruction from the first bottom-floor storage space 101 or put the target inventory receptacle 112 indicated in the handling instruction in the first bottom-floor storage space 101, and transport the target inventory receptacle 112 indicated in the handling instruction between the first bottom-floor storage space 101 and the one or more destinations 106.

In this application, the handling task includes at least: transporting the target inventory receptacle 112 containing the item from the storage space to the destination 106, that is, the process of exiting the warehouse by the item, and transporting the target inventory receptacle 112 containing the item from the destination 106 to the storage space, that is, the process of entering the warehousing by the item. As can be seen, in the system provided in this application, since the storage and retrieval equipment 102 may transport inventory receptacles between the bottom-floor storage spaces and the higher-floor storage spaces, the storage and retrieval equipment 102 may be mainly configured for handling of the target inventory receptacle 112 between the bottom-floor storage spaces and the higher-floor storage spaces, that is, the movement of the target inventory receptacle 112 in the vertical direction. Since the handling equipment 104 may transport the target inventory receptacle 112 between different storage spaces on the bottom floors and the destination 106, the handling equipment may be mainly configured for handling of the target inventory receptacle 112 between the bottom-floor storage spaces and the destination, that is, the movement of the target inventory receptacle 112 in the horizontal direction.

In addition, since the storage and retrieval equipment 102 needs to transport inventory receptacles in the higher-floor storage spaces, the center of gravity thereof is relatively high. The driving speed thereof is usually set lower to ensure safety. However, the handling equipment 104 is only used to transport inventory receptacles the bottom-floor storage spaces. therefore, the center of gravity thereof is relatively low, and the driving speed thereof may be set higher than that of the storage and retrieval equipment 102. In addition, the handling equipment 104 can drive both in the first aisle and in the second aisle. Therefore, when transporting inventory receptacles, the handling equipment may be prevented from driving in the same aisle with the storage and retrieval equipment 102 as possible, to improve the handling efficiency.

That is, in the system provided in this application, through the arrangement of the inventory rack 108, the warehouse includes the first aisle and the second aisle. The storage and retrieval equipment 102 and the handling equipment 104 with different emphases cooperate to perform a handling task, so that the storage and retrieval equipment 102 can be used primarily for vertical handling of the target inventory receptacles 112, reducing movement of the storage and retrieval equipment 102 between the storage space and the destination 106. The handling equipment 104 is used to transport inventory receptacles between storage spaces and destinations 106. The handling task is divided into several stages executed by different equipments, thereby improving the overall operating efficiency of the warehouse.

Based on the inventory system shown in FIG. 11, through the inventory racks arranged in the warehouse, the space between the inventory racks is used as the first aisle, and the space that runs through the bottom floor of the inventory rack and where no first bottom-floor storage space is arranged on the bottom floor of the inventory rack is used as the second aisle. The storage and retrieval equipment drives in the first aisle, the handling equipment may drive in the first aisle and/or the second aisle, and the storage and retrieval equipment and the handling equipment can be used together in the warehouse to transport items. Since the driving speed of the handling equipment capable of driving on the bottom floor is not affected by the height thereof, and the aisle of the handling equipment may be different from that of the storage and retrieval equipment, so that the cooperation of the handling equipment that can drive quickly and the storage and retrieval equipment that can transport from higher-floor storage spaces avoids the problems caused by the slow driving of the storage and retrieval equipment, and improves the warehouse handling efficiency and picking efficiency.

In addition, it should be further noted that, the warehouse and the related methods in the embodiments of this application are not only applicable to the picking and handling of commodity items in a warehousing scenario, but also applicable to the picking and handling of items such as finished products, semi-finished products, and semi-processed products in a factory production scenario. The picked items are used to realize a production link or for a production node. The specific application scenario is not limited in this application.

In this embodiment of this application, an inventory receptacle is configured to carry an item, but a specific form of the inventory receptacle is not limited in this application. For example, the inventory receptacle may be a pallet, a bin, or the like, as long as the inventory receptacle can accommodate or support the item.

Further, in this embodiment of this application, an occupancy rate of each floor of storage spaces, that is, a ratio of storage spaces with inventory receptacles to a total quantity of storage spaces, may be configured as required. Therefore, an occupancy rate of higher-floor storage spaces of an upper floor may be set between 0 and 100%, and an occupancy rate of bottom-floor storage spaces of a bottom floor may be set between 0 and 100%.

In addition, in one or more embodiments provided in this application, the bottom floor of the inventory rack 108 may be alternatively fully provided with first bottom-floor storage spaces 101. Since there is no remaining space on the bottom floor of the inventory rack 108, the handling equipment 104 may share the first aisle with the storage and retrieval equipment 102, and the two equipments respectively transport the target inventory receptacle 112 according to the received handling instruction.

In this case, although the handling equipment 104 and the storage and retrieval equipment 102 need to share the first aisle, when there is no storage and retrieval equipment 102 in the first aisle of the route planning, the handling equipment 104 can still transport inventory receptacles at a relatively high moving speed. In addition, since the destinations 106 are located in the area where the inventory rack 108 is located in this embodiment of this application, and the handling equipment 104 may be mainly configured for handling inventory receptacles between the bottom-floor storage spaces and the destinations 106, the storage and retrieval equipment 102 can be prevented from moving between the area where the inventory rack 108 is located and the destinations 106, and the handling equipment 104 moves between the area where the inventory rack 108 is located and the destinations 106, to improve the operating efficiency of the warehouse, as shown in FIG. 13.

Figure 13:
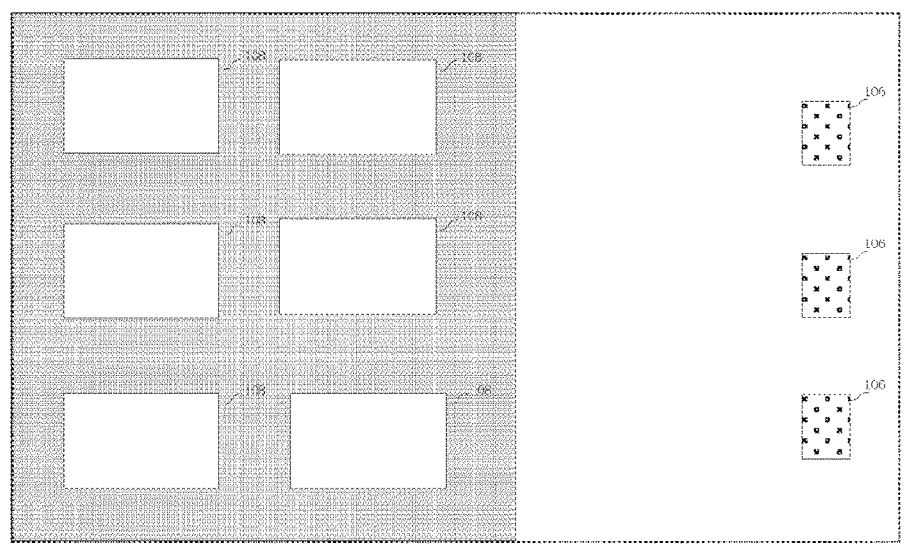
FIG. 13 is a schematic diagram of a storage and retrieval equipment operating area and a handling equipment operating area in an inventory system according to an embodiment of this application.

FIG. 13 is a schematic diagram of a storage and retrieval equipment operating area and a handling equipment operating area according to an embodiment of this application. As can be seen, the storage and retrieval equipment 102 can only move in the area where the inventory rack 108 is located, and lift or lower inventory receptacles; and the handling equipment mainly moves in the horizontal direction to transport inventory receptacles. The solid line shows the operating area of the storage and retrieval equipment 102, and the dashed line shows the operating area of the handling equipment 104. The operating areas of the storage and retrieval equipment 102 and the handling equipment 104 are separated to a certain extent, which can effectively improve the overall operating efficiency of the warehouse.

In addition, in one or more embodiments provided in this application, at least one row of second bottom-floor storage spaces 114 may be further arranged on a bottom floor of the inventory rack 108 not adjacent to the first aisle, and at least some of the second bottom-floor storage spaces 114 on the bottom floor of the inventory rack 108 are provided with inventory receptacles. Therefore, in this case, space where no first bottom-floor storage space 101 or second bottom-floor storage space 114 is arranged on the bottom floor of the inventory rack 108 forms a second aisle, as shown in FIG. 14.

Figure 14:
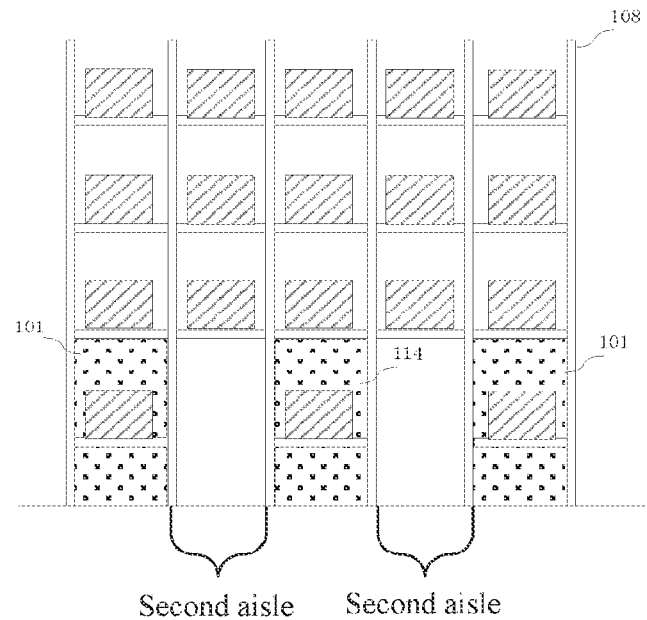
FIG. 14 is a schematic diagram of a form of an inventory rack according to an embodiment of this application.

FIG. 14 is a schematic diagram of a form of an inventory rack according to an embodiment of this application. As can be seen, two rows of first bottom-floor storage spaces 101 are arranged on a surface of the bottom floor of the inventory rack adjacent to the first aisle, a row of second bottom-floor storage spaces 114 are arranged in the middle of the bottom floor, and space between the first bottom-floor storage spaces 101 and the second bottom-floor storage spaces 114 forms a second aisle.

Further, in this embodiment of this application, the first bottom-floor storage spaces 101 may be alternatively adjacent to the second bottom-floor storage spaces 114, and the remaining space in the bottom floor of the inventory rack 108 may also form a second aisle. That is, in this embodiment of this application, it is not limited that the second aisle is formed by the space between the first bottom-floor storage spaces 101 and the second bottom-floor storage spaces 114, and space where no first bottom-floor storage spaces 101 or second bottom-floor storage spaces 114 is arranged on the bottom floor may all be considered as a second aisle. Since the second aisle is used for the handling equipment 104 to drive, the formed second aisle runs through the bottom floor of the inventory rack 108.

Figure 15:
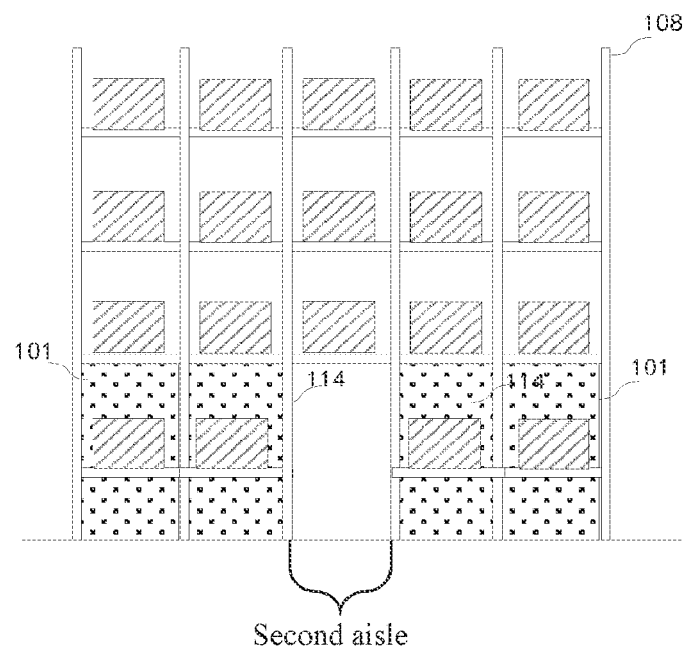
FIG. 15 is a schematic diagram of a form of an inventory rack according to an embodiment of this application.

FIG. 15 is a schematic diagram of a form of an inventory rack according to an embodiment of this application. As can be seen, two rows of first bottom-floor storage spaces 101 are arranged on a surface of the bottom floor of the inventory rack adjacent to the first aisle, two rows of second bottom-floor storage spaces 114 are respectively arranged at positions adjacent to the first bottom-floor storage spaces 101, and space between the second bottom-floor storage spaces 114 forms a second aisle.

In this embodiment of this application, since the storage and retrieval equipment 102 can pick an inventory receptacle in a higher-floor storage space not close to the first aisle, the storage and retrieval mechanism of the storage and retrieval equipment 102 can extend and retract to pick inventory receptacles at different extension positions. Therefore, inventory receptacles in the second bottom-floor storage spaces 114 may also be taken out by the storage and retrieval equipment 102, or inventory receptacles may be placed in the second bottom-floor storage spaces 114 by the storage and retrieval equipment 102.

However, since the second bottom-floor storage spaces 114 are located on the bottom floor, the handling equipment 104 can perform a picking or placing operation in the second bottom-floor storage spaces 114. Therefore, to improve the handling efficiency of the warehouse, only the handling equipment 104 picks or places the inventory receptacles in the second bottom-floor storage spaces 114 in this embodiment of this application.

By setting the second bottom-floor storage space 114, the space utilization rate of the inventory rack 108 can be improved, so that the inventory rack 108 with a larger area can be arranged in the warehouse. In addition, the handling equipment 104 can pick and place inventory receptacles in the second bottom-floor storage spaces 114, which can reduce the handling pressure of the storage and retrieval equipment 102.

Further, the inventory receptacles in the second bottom-floor storage spaces 114 may be taken out by the handling equipment 104, or the inventory receptacles may be put in the second bottom-floor storage spaces 114 by the handling equipment 104. The first bottom-floor storage spaces 101 on bottom floor of the inventory rack 108 are adjacent to the first aisle. Therefore, the second bottom-floor storage spaces 114 are adjacent to at least one second aisle. As shown in FIG. 14, the second bottom-floor storage spaces 114 are adjacent to two second aisles, and in FIG. 15, the second bottom-floor storage spaces 114 are adjacent to one second aisle.

However, in one or more embodiments provided in this application, the handling equipment 104 is further configured to take out, according to a handling instruction sent by the control system 100, a target inventory receptacle 112 indicated in the handling instruction from a second bottom-floor storage space 114 or put the target inventory receptacle 112 indicated in the handling instruction in the second bottom-floor storage space 114, and transport the target inventory receptacle 112 indicated in the handling instruction between the second bottom-floor storage space 114 and the one or more destinations 106 or between the first bottom-floor storage space 101 and the second bottom-floor storage space 114.

In addition, in one or more embodiments provided in this application, the storage and retrieval equipment 102 may pick and place inventory receptacles in higher-floor storage spaces with a plurality of extension positions. When the target inventory receptacle 112 is in a higher-floor storage space not adjacent to the first aisle, and there are blocking inventory receptacles outside the target inventory receptacle 112, the control system 100 needs to respectively send a handling instruction to at least two storage and retrieval equipments 102, so that the at least two storage and retrieval equipments 102 cooperate to first remove the blocking inventory receptacles outside the target inventory receptacle 112, and then obtain the target inventory receptacle 112. When the target inventory receptacle 112 is placed in a higher-floor storage space with a plurality of extension positions, if there are blocking inventory receptacles outside, the cooperation of a plurality of storage and retrieval equipments 102 is also required.

Further, in one or more embodiments provided in this application, to increase a transport capacity of a single storage and retrieval equipment 102 and reduce a minimum quantity of storage and retrieval equipments 102 required for warehouse operation, the storage and retrieval equipment 102 may be further provided with a temporary storage support. The temporary storage support is provided with a plurality of floors, and each floor is provided with at least one temporary storage space, so that the storage and retrieval equipment 102 can transport a plurality of inventory receptacles.

Figure 16A:
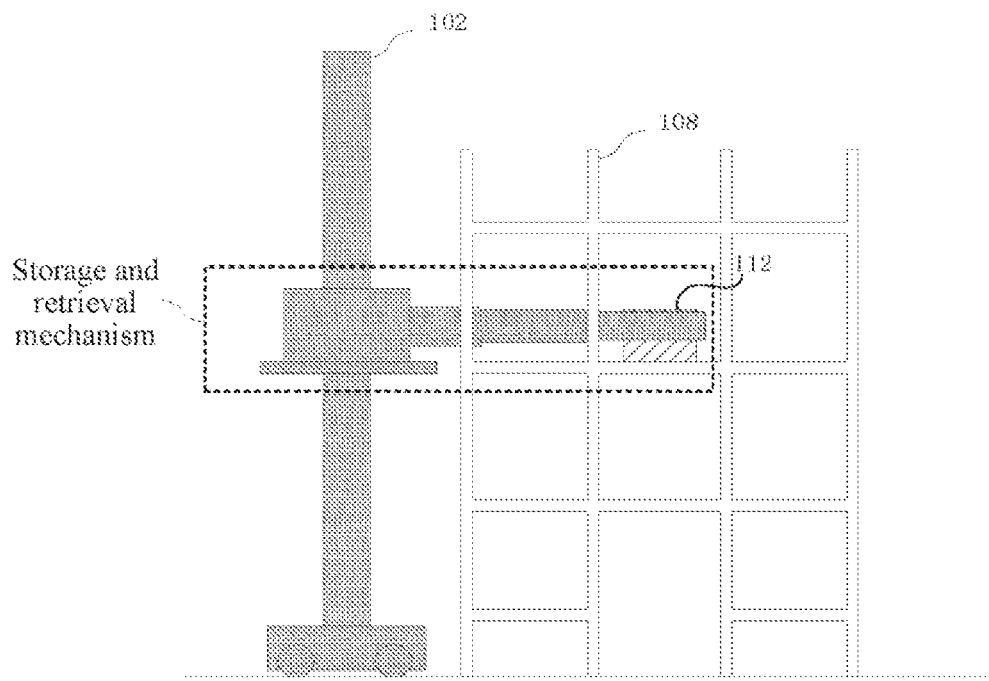
FIG. 16a to FIG. 16c are schematic diagrams of a storage and retrieval equipment according to an embodiment of this application.
Figure 16B:
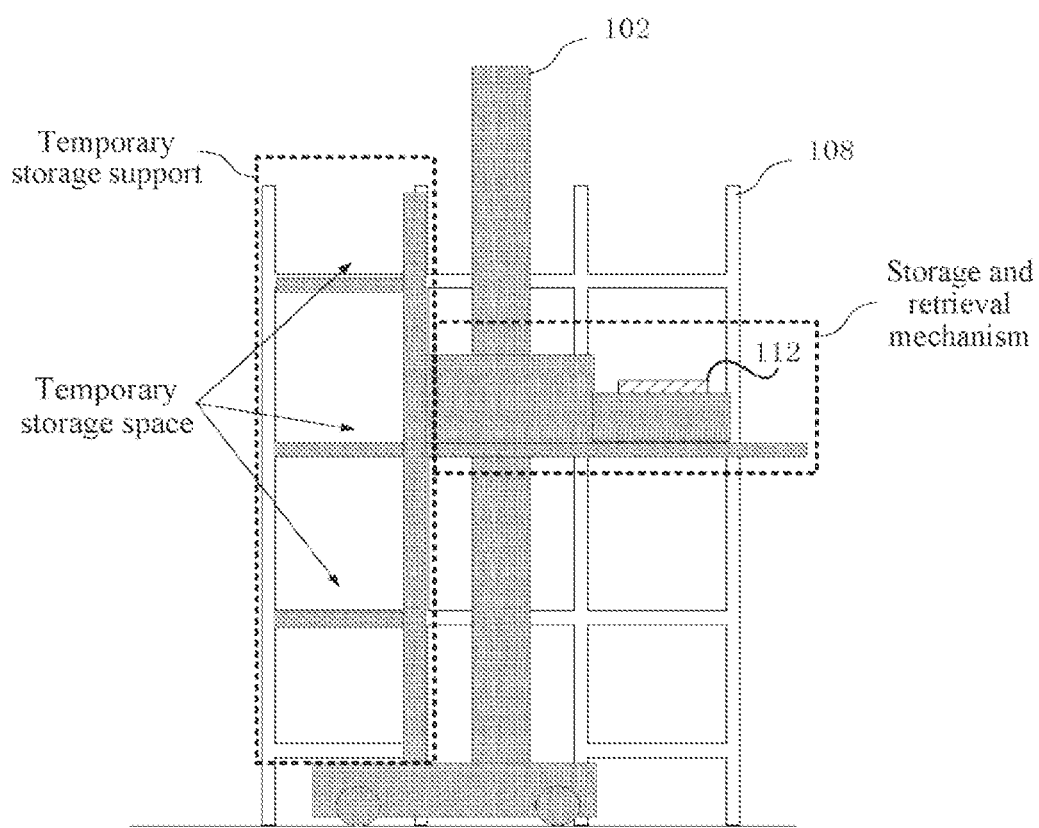

FIG. 16a and FIG. 16b are schematic diagrams of a storage and retrieval equipment according to an embodiment of this application. As can be seen, the storage and retrieval equipment 102 includes a storage and retrieval mechanism. The storage and retrieval mechanism can be extended and retracted to take out inventory receptacles from storage spaces with a plurality of extension positions, or place inventory receptacles in storage spaces with a plurality of extension positions. The storage and retrieval mechanism is arranged on a lifting mechanism and can move in the vertical direction to align positions of different floors to pick and place inventory receptacles. As can be seen in FIG. 16b, the storage and retrieval equipment is provided with a temporary storage support, and the temporary storage support is provided with corresponding temporary storage spaces at a same height as each floor of the inventory rack 108. The storage and retrieval mechanism of the storage and retrieval equipment 102 can rotate 90 degrees after taking out an item, and put the item in any idle temporary storage space of the temporary storage support.

Further, in this embodiment of this application, the storage and retrieval equipment 102 may be provided with a temporary storage support including a plurality of temporary storage spaces. Therefore, when there are blocking inventory receptacles outside the target inventory receptacle 112, the storage and retrieval equipment 102 is further configured to transport, when it is determined that the target inventory receptacle 112 indicated in the handling instruction is not in a higher-floor storage space adjacent to the first aisle, the blocking inventory receptacles outside the higher-floor storage space where the target inventory receptacle is located to at least one temporary storage space of the temporary storage support of the storage and retrieval equipment 102 according to the handling instruction, and take out the target inventory receptacle 112.

That is, the temporary storage support of the storage and retrieval equipment 102 can be used to temporarily store target inventory receptacles 112 that need to be transported corresponding to a plurality of handling tasks, and can also temporarily store blocking inventory receptacles in the inventory rack 108 when picking and placing the target inventory receptacles 112. Therefore, a storage and retrieval equipment 102 provided with a temporary storage support can implement handling tasks of a plurality of storage and retrieval equipments 102 without temporary storage supports. The control system 100 can send fewer handling instructions according to the handling tasks, and there may be fewer storage and retrieval equipments 102 operating in the warehouse, reducing the traffic pressure of the first aisle.

Figure 16C:
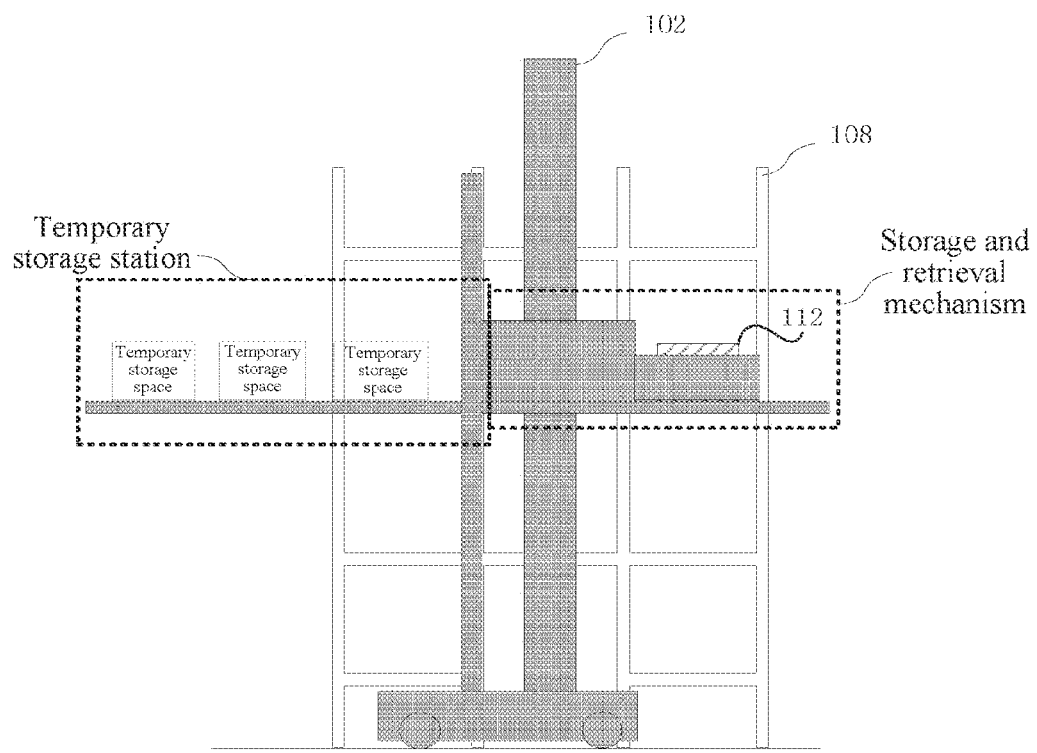

In one or more embodiments provided in this application, one or more temporary storage stations may be further arranged in the storage and retrieval equipment 102, and each temporary storage station is provided with at least one temporary storage space. The storage and retrieval equipment 102 is further configured to take out, when it is determined that the target inventory receptacle 112 indicated in the handling instruction is not in a higher-floor storage space adjacent to the first aisle, at least one blocking inventory receptacle outside the higher-floor storage space where the target inventory receptacle is located and place the at least one blocking inventory receptacle in temporary storage spaces of the one or more temporary storage stations by using the storage and retrieval mechanism according to the handling instruction, and take out the target inventory receptacle 112 by using the storage and retrieval mechanism. FIG. 16c is a schematic diagram of a storage and retrieval equipment according to an embodiment of this application. As can be seen, the storage and retrieval equipment 102 is provided with a temporary storage station, and the temporary storage station includes at least one temporary storage space for temporarily storing blocking inventory receptacles.

In addition, in one or more embodiments provided in this application, the handling equipment 104 is further configured to take out, according to the handling instruction, the target inventory receptacle 112 indicated in the handling instruction from a higher-floor storage space above the second aisle in the inventory rack 108 or put the target inventory receptacle 112 indicated in the handling instruction in the higher-floor storage space above the second aisle, and transport the target inventory receptacle 112 indicated in the handling instruction in at least one case of between the higher-floor storage space above the second aisle and the first bottom-floor storage space 101, between the higher-floor storage space above the second aisle and the destinations, or between the higher-floor storage space above the second aisle and the second bottom-floor storage space.

Figure 17:
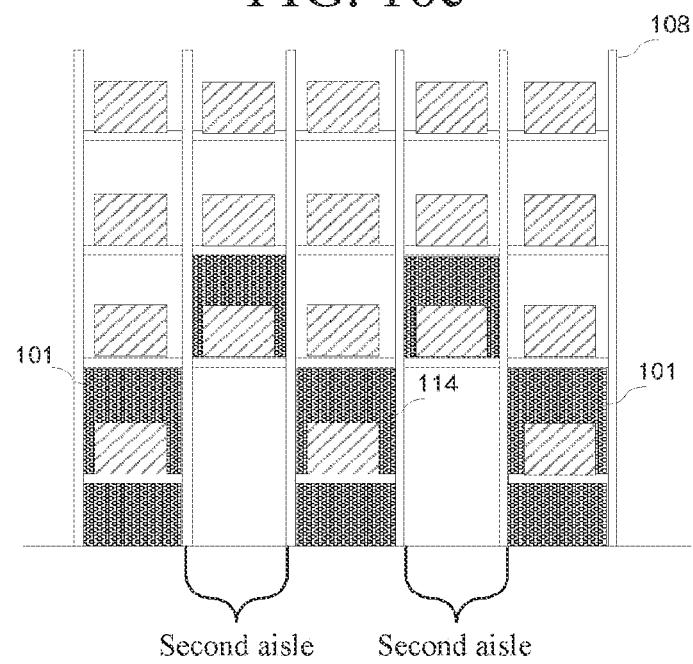
FIG. 17 is a schematic diagram of positions of storage spaces of inventory receptacles picked and placed by a handling equipment according to an embodiment of this application.

Therefore, in this application, the storage spaces where the handling equipment 104 can pick and place inventory receptacles can be further expanded, as shown in FIG. 17. FIG. 17 is a schematic diagram of positions of storage spaces of inventory receptacles picked and placed by a handling equipment according to an embodiment of this application. A cross-sectional view of an inventory rack 108 is shown in FIG. 17, where storage spaces filled with oblique lines include the first bottom-floor storage spaces 101, the second bottom-floor storage spaces 114, and the higher-floor storage spaces above the second aisle. The storage spaces are all storage spaces where the handling equipment 104 can pick and place inventory receptacles, which can further reduce the pressure for the storage and retrieval equipment 102 to pick and place inventory receptacles in the storage spaces, that is, the storage spaces not filled with oblique lines in FIG. 8, to further improve the overall operating efficiency of the warehouse.

In addition, in one or more embodiments provided in this application, when the inventory rack 108 includes at least the first bottom-floor storage spaces 101, the control system 100 may be further configured to determine circulation rates of items stored in the warehouse according to historical data, determine hot items at least partially according to an order of the circulation rates of the items from high to low and the quantity of the first bottom-floor storage spaces in the warehouse, and use at least some of the first bottom-floor storage spaces 101 for placing inventory receptacles storing the hot items.

Specifically, the control system 100 may first determine the circulation rates of the items stored in the warehouse according to the historical data, including such as historical order data and historical handling task data. Since the quantity of the first bottom-floor storage spaces 101 is limited, several items with higher circulation rates may be determined as hot items at least partially according to an order of the circulation rates of the items from high to low and the quantity of the first bottom-floor storage spaces 101, and it is determined that at least some of the first bottom-floor storage spaces 101 are used for placing inventory receptacles storing the hot items.

For example, assuming that the quantity of the first bottom-floor storage spaces 101 is 200, the control system 100 may use the top 200 items with circulation rates from high to low at most as hot items, and use at least some of the first bottom-floor storage spaces 101 for place inventory receptacles storing the hot items.

Further, in one or more embodiments provided in this application, when the inventory rack 108 includes the first bottom-floor storage spaces 101, the second bottom-floor storage spaces 114, and the higher-floor storage spaces above the second aisle, The control system 100 may be further configured to determine circulation rates of items stored in the warehouse according to historical data, determine hot items at least partially according to an order of the circulation rates of the items from high to low, the quantity of the first bottom-floor storage spaces 101 in the warehouse, the quantity of the second bottom-floor storage spaces 114 in the warehouse, and the quantity of the higher-floor storage spaces above the second aisle in the warehouse, and use at least some of the first bottom-floor storage spaces 101, the second bottom-floor storage spaces 114, and the higher-floor storage spaces above the second aisle for placing inventory receptacles storing the hot items.

That is, since the handling equipment 104 is more efficient in transporting inventory receptacles than the storage and retrieval equipment 102, the hot items may be determined according to the circulation rates of the items, and the inventory receptacles storing the hot items may be placed in storage spaces where the handling equipment 104 can perform handling, so that the handling frequency of the storage and retrieval equipment 102 is reduced, and the handling equipment 102 can transport inventory receptacles storing items with lower circulation rates as possible.

Further, in one or more embodiments provided in this application, the handling equipment 104 can transport inventory receptacles in the first bottom-floor storage spaces 101, the second bottom-floor storage spaces 114, and the higher-floor storage spaces above the second aisle, and the first bottom-floor storage spaces 101, the second bottom-floor storage spaces 114, and the higher-floor storage spaces above the second aisle generally have different handling complexity. Therefore, the control system 100 can further distinguish the inventory receptacles stored in the first bottom-floor storage spaces 101, the second bottom-floor storage spaces 114, and the higher-floor storage spaces above the second aisle according to circulation rates of hot items.

Specifically, since the first bottom-floor storage spaces 101 can temporarily store the target inventory receptacle 112 when the storage and retrieval equipment 102 and the handling equipment 104 cooperate to transport the target inventory receptacle 112 to complete the handling task, the first bottom-floor storage space 101 further has the function of temporarily storing the target inventory receptacle 112. If the first bottom-floor storage spaces 101 are all occupied by inventory receptacles storing hot items, it is difficult for the storage and retrieval equipment 102 and the handling equipment 104 to cooperate to transport the target inventory receptacle 112. Therefore, in this embodiment of this application, circulation rates of items stored in inventory receptacles placed in the higher-floor storage spaces above the second aisle may not be less than circulation rates of items stored in inventory receptacles placed in the first bottom-floor storage spaces 101. Therefore, the inventory receptacles storing the hot items are prevented from being placed in the higher-floor storage spaces above the second aisle as possible, to minimize the impact on the first bottom-floor storage spaces 101.

Similarly, in one or more embodiments provided in this application, circulation rates of items stored in inventory receptacles placed in the second bottom-floor storage spaces 114 may also not be less than the circulation rates of items stored in inventory receptacles placed in the first bottom-floor storage spaces 101.

In addition, the storage spaces adjacent to the first aisle have higher picking and placing efficiency of inventory receptacles than the storage spaces not adjacent to the first aisle. Therefore, based on the consideration of improving the efficiency of picking and placing inventory receptacles, in one or more embodiments provided in this application, circulation rates of items stored in inventory receptacles placed in the storage spaces adjacent to the first aisle are greater than circulation rates of items stored in inventory receptacles placed in the storage spaces not adjacent to the first aisle.

The foregoing rules for determining storage spaces of items according to different circulation rates can be used individually or in combination. When the rules are used in combination, if there is a conflict, storage spaces for different items can be comprehensively determined in the manner of weighted summation, which is not limited in this application.

In addition, in one or more embodiments provided in this application, the control system 100 may further adjust storage spaces of inventory receptacles in the warehouse according to requirements. The control system 100 may send a position change instruction to the storage and retrieval equipment 102 and/or the handling equipment 104, so that the storage and retrieval equipment 102, or the handling equipment 104, or the storage and retrieval equipment 102 and the handling equipment 104 may adjust the positions of the inventory receptacles.

Specifically, the control system 100 is further configured to send a position change instruction to the storage and retrieval equipment 102. The position change instruction includes a current storage space of the target inventory receptacle 112 whose position needs to be changed, and a position of a storage space to which the target inventory receptacle 112 needs to be changed.

The storage and retrieval equipment 102 may be further configured to change a target inventory receptacle 112 indicated in the position change instruction from a current storage space to at least one of the first bottom-floor storage space 101, the second bottom-floor storage space 114, or the higher-floor storage space above the second aisle according to the position change instruction.

As can be seen, the control system 100 can cause the storage and retrieval equipment 102 to complete the position change of the target inventory receptacle 112 only by sending the position change instruction to the storage and retrieval equipment 102. The current storage space may specifically be another higher-floor storage space of the inventory rack 108 except the higher-floor storage spaces above the second aisle.

Further, in one or more embodiments of this application, the current storage space of the target inventory receptacle 112 may be alternatively a non-higher-floor storage space. The storage and retrieval equipment 102 is further configured to change the target inventory receptacle 112 indicated in the position change instruction from the first bottom-floor storage space 101 to the higher-floor storage space above the second aisle according to the position change instruction. That is, the current storage space may be alternatively the first bottom-floor storage space 101.

In addition, in one or more embodiments of this application, the control system 101 is further configured to send a position change instruction to the handling equipment 104. Since the handling equipment 104 can only pick and place target inventory receptacles 112 in the first bottom-floor storage spaces 101, the second bottom-floor storage spaces 114, and the higher-floor storage spaces above the second aisle, the current storage space and the storage space to be changed to in the position change instruction are respectively one of the foregoing three storage spaces.

Specifically, the handling equipment 104 is further configured to place a target inventory receptacle 112 indicated in the position change instruction from a second bottom-floor storage space 114 and an inventory receptacle in a higher-floor storage space above the second aisle in first bottom-floor storage spaces 101 according to the position change instruction.

In addition, in one or more embodiments of this application, the control system 100 may alternatively only transport inventory receptacles longitudinally inward in the higher-floor storage spaces of the inventory racks 108 to storage spaces outside the inventory rack 108 near the first aisle. The control system 100 is further configured to send a position change instruction to the storage and retrieval equipment 102.

Therefore, the storage and retrieval equipment 102 is further configured to change a target inventory receptacle 112 indicated in the position change instruction from a storage space not adjacent to the first aisle to a storage space adjacent to the first aisle according to the position change instruction.

In addition, in one or more embodiments provided in this application, when the destination is a picking station, after the handling equipment 104 transports the target inventory receptacle 112 to the destination and picks items in the target inventory receptacle 112 at the picking station, the handling equipment 104 further needs to return the target inventory receptacle 112 to the storage space of the inventory rack 108.

In this case, the control system 100 may determine a new handling task, determine a storage and retrieval equipment 102 and/or a handling equipment 104 that performs the handling task, and respectively send a handling instruction for performing the handling task to the storage and retrieval equipment 102 and the handling equipment 104, so that the storage and retrieval equipment 102 and the handling equipment 104 can transport the target inventory receptacle 112 back to the original storage space according to the handling instruction. That is, the target inventory receptacle 112 is returned to the storage space where the target inventory receptacle 112 is transported out of the inventory rack 108, that is, returned to the original position.

Further, in one or more embodiments provided in this application, when the target inventory receptacle 112 is returned in the manner of returning to the original position, if the original position of the target inventory receptacle 112 is a higher-floor storage space, the storage and retrieval equipment 102 further needs to transport the target inventory receptacle 112 back to the higher-floor storage space. If the first bottom-floor storage space 101 where the target inventory receptacle 112 is returned by the handling equipment 104 is far away from the higher-floor storage space in the horizontal direction, the storage and retrieval equipment 102 needs to move a long distance to return the target inventory receptacle 112, which affects the operating efficiency of the warehouse. Therefore, in this embodiment of this application, when the original position of the target inventory receptacle 112 is a higher-floor storage space, the control system 100 may determine an idle first bottom-floor storage space 101 that is closest to the higher-floor storage space in the horizontal direction as a first bottom-floor storage space 101 where the handling equipment 104 returns the target inventory receptacle 112, to reduce the distance that the storage and retrieval equipment 102 needs to drive.

Alternatively, in one or more embodiments of this application, the handling equipment 104 is further configured to return the target inventory receptacle 112 indicated in the handling instruction to the first bottom-floor storage space 101 according to the handling instruction, and the storage and retrieval equipment 102 is further configured to take out, according to the handling instruction, the target inventory receptacle 112 indicated in the handling instruction from the first bottom-floor storage space 101 and put the target inventory receptacle 112 in any idle higher-floor storage space. That is, the control system 100 also uses any idle higher-floor storage space as a storage space to which the target inventory receptacle 112 is returned, to minimize the distance that storage and retrieval equipment 102 and handling equipment 104 need to drive.

Further, in one or more embodiments provided in this application, when the target inventory receptacle 112 is returned in the manner of returning to the original position, if the original position of the target inventory receptacle 112 is a higher-floor storage space, the storage and retrieval equipment 102 also needs to participate in the handling during returning, which affects the operating efficiency of the warehouse. Therefore, the handling equipment 104 is further configured to return the target inventory receptacle 112 indicated in the handling instruction to at least one of the first bottom-floor storage space 101, the second bottom-floor storage space 114, or the higher-floor storage space above the second aisle according to the handling instruction. That is, the control system 100 may determine any idle storage space from the first bottom-floor storage spaces 101, the second bottom-floor storage spaces 114 and the higher-floor storage spaces above the second aisle as a storage space storing the target inventory receptacle 112 in a control instruction sent to the handling equipment 104, to improve the efficiency of returning the target inventory receptacle 112.

When the storage space to which the target inventory receptacle 112 is returned changes, the control system 100 further needs to update a record of the storage space of the item.

Further, in one or more embodiments provided in this application, when the target inventory receptacle 112 is returned to the second bottom-floor storage space 114 or the higher-floor storage space above the second aisle, the handling equipment 104 is further configured to, take out, according to the handling instruction, the target inventory receptacle 112 from the second bottom-floor storage space 114 or the higher-floor storage space above the second aisle, and put the target inventory receptacle in the first bottom-floor storage space 101.

The storage and retrieval equipment 102 is further configured to take out, according to the handling instruction, the target inventory receptacle 112 indicated in the handling instruction from the first bottom-floor storage space 101 and put the target inventory receptacle 112 in any idle higher-floor storage space.

In addition, in this application, when the storage and retrieval equipment 102 needs to transport a blocking inventory receptacle to an idle storage space, generally for the consideration of improving the handling efficiency of the storage and retrieval equipment 102, the control system 100 determines an idle higher-floor storage space closest to the storage space of the blocking inventory receptacle as a storage space for storing the blocking inventory receptacle, and generally selects an idle higher-floor storage space adjacent to the first aisle, to reduce time-consuming of expansion and contraction processes of an item picking structure of the storage and retrieval equipment 102. However, this increases the probability that the blocking inventory receptacle continues to be a blocking inventory receptacle in other handling tasks.

Therefore, in one or more embodiments provided in this application, the handling efficiency of the storage and retrieval equipment 102 is lower than that of the handling equipment 104. Therefore, when the storage and retrieval equipment 102 needs to transport a blocking inventory receptacle to an idle storage space, the storage and retrieval equipment 102 may place the blocking handling equipment in an idle higher-floor storage space above the second aisle, which reduces the probability that the storage and retrieval equipment 102 needs to move the blocking inventory receptacle when transporting inventory receptacles according to other handling instructions, thereby improving the operating efficiency of the warehouse.

In addition, in one or more embodiments provided in this application, the storage and retrieval equipment 102 and the handling equipment 104 may at least drive in the first aisle and the second aisle by navigating with positioning identification marks. Therefore, identification marks for positioning are set in the warehouse space. The storage and retrieval equipment 102 and the handling equipment 104 performs positioning through the identification marks set in the warehouse space. The identification mark may specifically be a digital object unique identifier (DOI), whose specific form may be a barcode, a two-dimensional code, a color code, or the like. The identification mark may be set on the floor, the ceiling, or the inventory racks of the warehouse. The specific form of the identification marks used for positioning and the setting positions thereof are not limited in this application and may be set as required.

Further, in an embodiment, the identification marks may be set in the warehouse space at different intervals.

Further, in this embodiment of this application, to make the positioning of the handling equipment 104 more accurate when transporting the target inventory receptacle 112, that is, a difference between the center of the target inventory receptacle 112 and a center position of a component of the handling equipment 104 supporting the target inventory receptacle 112 is smaller, the stability of the handling equipment 104 in transporting the target inventory receptacle 112 is improved.

In this application, bottoms of the inventory receptacles in the warehouse are provided with identification marks for positioning. The identification marks may be in the middle of the inventory receptacles. The handling equipment 104 is provided with an image sensor that shoots upwards, which is configured to determine, when the handling equipment 104 transports the target inventory receptacle 112, a position and/or an attitude of the target inventory receptacle 112 according to an identification mark in an acquired image.

Specifically, the handling equipment 104 is further configured to reach a target position according to the handling instruction sent by the control system 100, determine a deviation between a position of the handling equipment and the position of the target inventory receptacle 112 according to an image acquired in real time, determine whether the deviation is greater than a preset threshold, and take out the target inventory receptacle 112 from a storage space of the target position after adjusting the position of the handling equipment according to the deviation if the deviation is greater than the preset threshold, or drive to the target position and take out the target inventory receptacle 112 from the storage space if the deviation is not greater than the preset threshold.

It should be noted that, when driving to the storage space storing the target inventory receptacle 112 according to the control instruction, the handling equipment 104 may monitor a distance from the storage space storing the target inventory receptacle 112, and reach a target position when the distance from the storage space is not greater than a preset distance.

The handling equipment 104 may continue to drive to the storage space according to the control instruction, acquire images in real time through the image sensor, and determine a deviation between the position thereof and the position of the target inventory receptacle 112 according to the images for each frame of images acquired. When the deviation is greater than a preset threshold, the handling equipment 104 may adjust the position thereof, which is equivalent to re-determining the position thereof, perform positioning according to the re-determined position and the identification marks, drive to the storage space to take out the target inventory receptacle 112, and re-determine the position thereof to eliminate the deviation between the position thereof and the position of the target inventory receptacle 112.

Therefore, when the target inventory receptacle 112 is deviated when being placed in the storage space, leading to a deviation between the target inventory receptacle 112 and the center of the storage space, the handling equipment 104 may adjust the position thereof in real time and change the driving trajectory when driving to the storage space again. In this way, when reaching the storage space, the handling equipment 104 is aligned with the target inventory receptacle 112 instead of the storage space.

In addition, in one or more embodiments provided in this application, the handling equipment 104 is further configured to determine a deviation between a center of the handling equipment and a center of the transported target inventory receptacle according to the handling instruction sent by the control system 100 and information acquired by the sensor arranged on the handling equipment 104.

The sensor includes: at least one of a radio frequency sensor, an image sensor, a magnetic sensor, or a short-range communication chip, so that the handling equipment 104 may utilize a radio frequency identification technology, an image identification technology, a magnetic navigation technology, and the like to determine the position thereof and the center of the target inventory receptacle, to determine an attitude deviation.

The handling equipment 104 is further configured to adjust the target position and/or adjust an attitude of the handling equipment at the target position according to the deviation and a position of the first bottom-floor storage space 101, the second bottom-floor storage space 114, or the higher-floor storage space above the second aisle; and put the target inventory receptacle 112 in the first bottom-floor storage space 101, the second bottom-floor storage space 114, or the higher-floor storage space above the second aisle after driving to the target position.

That is, when the handling equipment 104 takes out the target inventory receptacle 112, the position of the target inventory receptacle 112 may deviate from the position of the handling equipment. In this case, to put the target inventory receptacle 112 rightly in the storage space, the handling equipment 104 may determine a deviation between the position thereof and the position of the target inventory receptacle 112 being transported, and adjust the target position or adjust the attitude thereof at the target position.

Further, in one or more embodiments provided in this application, heights of inventory receptacle racks of at least some of the first bottom-floor storage spaces 101 and at least some of the second bottom-floor storage spaces 114 on the bottom floor of the inventory rack 108 are greater than a height of the handling equipment 104 when carrying no inventory receptacle.

Therefore, in this embodiment of this application, the handling equipment 104 may use various manners to transport the target inventory receptacle 112 from the bottom-floor storage space or store the target inventory receptacle 112.

Specifically, the handling equipment 104 is further configured to selectively drive below the at least some of the first bottom-floor storage spaces 101 and the at least some of the second bottom-floor storage spaces 114 when carrying no inventory receptacle, or transport the target inventory receptacle in a piggybacking manner and leave from below the at least some of the first bottom-floor storage spaces 101 and the at least some of the second bottom-floor storage spaces 114.

Alternatively, in this embodiment of this application, since the first bottom-floor storage spaces 101 are at least adjacent to the first aisle, the handling equipment 104 is further configured to take out the target inventory receptacle from a side of the first bottom-floor storage space 101 on the first aisle adjacent to the first bottom-floor storage space 101 to the handling equipment 104, or put the target inventory receptacle 112 on the handling equipment 104 to the first bottom-floor storage space 101 from the side of the first bottom-floor storage space 101.

If the first bottom-floor storage spaces 101 are also adjacent to the second aisle, the handling equipment 104 is further configured to take out the target inventory receptacle from a side of the first bottom-floor storage space 101 on the second aisle adjacent to the first bottom-floor storage space 101 to the handling equipment 104, or put the target inventory receptacle 112 on the handling equipment 104 to the first bottom-floor storage space 101 from the side of the first bottom-floor storage space 101.

Alternatively, in this embodiment of this application, since the second bottom-floor storage spaces 114 are at least adjacent to the second aisle, the handling equipment 104 is further configured to take out the target inventory receptacle 112 from a side of the second bottom-floor storage space 114 on the second aisle adjacent to the second bottom-floor storage space 114 to the handling equipment 104, or put the target inventory receptacle 112 on the handling equipment 104 to the second bottom-floor storage space 114 from the side of the second bottom-floor storage space 114.

Figure 18:
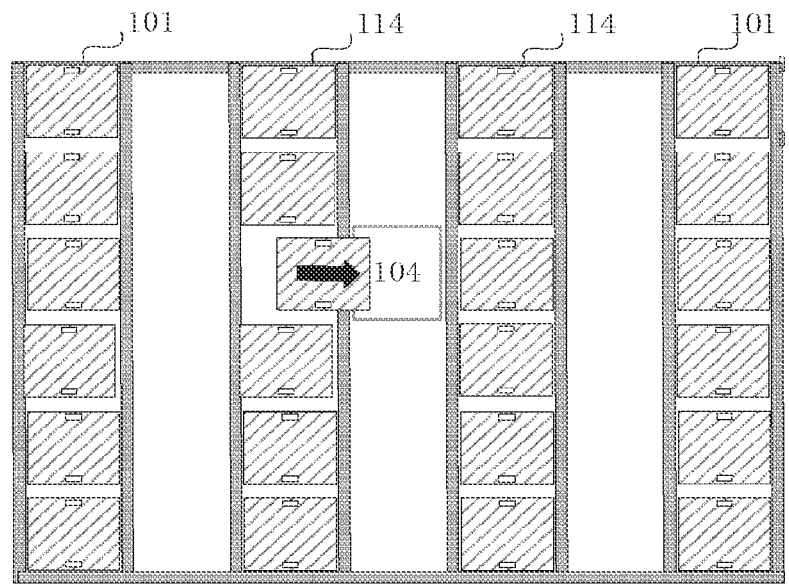
FIG. 18 is a schematic diagram of picking and placing an inventory receptacle from a side by a handling equipment according to an embodiment of this application.

FIG. 18 is a schematic diagram of picking and placing an inventory receptacle from a side by a handling equipment according to an embodiment of this application. The handling equipment 104 is located at a position of the second aisle adjacent to the second bottom-floor storage space 114, and picks and places the inventory receptacles from the side of the second bottom-floor storage space 114.

In addition, in one or more embodiments provided in this application, when the destination 106 is a picking station, an operating terminal 116 is further arranged at the destination 106, and the operating terminal 116 may be a station for the picking staff, or picking equipments.

The operating terminal 116 is configured to take out an item from the target inventory receptacle 112 at the destination 106, or put the item into the target inventory receptacle 112. In one or more embodiments provided in this application, the destination 106 includes at least two or more operating terminals 116.

Since the handling equipment 104 generally lowers the height of the target inventory receptacle 112 to lower the center of gravity when the handling equipment 104 transports the target inventory receptacle 112, the target inventory receptacle 112 has a lower height when the handling equipment 104 transports the target inventory receptacle 112 to the destination 106. Therefore, when manual item picking is conducted at the operating terminal 116, the staff are required to take out the item from the lower target inventory receptacle 112, resulting in a heavy workload for the staff.

Therefore, in one or more embodiments provided in this application, the handling equipment 104 is further configured to lift the target inventory receptacle 112 to a preset height when transporting the target inventory receptacle 112 to the destination 106, so that the operating terminal 116 at the destination takes out the item from the target inventory receptacle 112, or put the item into the target inventory receptacle 112. The preset height may be set as required. For example, an average height of the staff working in the warehouse is calculated, to determine an average height of the staff when hands thereof are in a natural sagging state as the preset height. Alternatively, the heights of the hands of the staff in the natural sagging state are calculated, and a preset height is determined according to a height of a hand of the staff in the natural sagging state working at the destination 106. That is, different or the same preset heights are determined adapting to different staff.

Alternatively, since the height of lifting the target inventory receptacle 112 by the handling equipment 104 is limited, requirements may not be fully met. Therefore, in one or more embodiments provided in this application, a lifting equipment 118 is further arranged at the destination 106.

The handling equipment 104 is further configured to put, when transporting the target inventory receptacle 112 to the destination 106, the target inventory receptacle 112 into the lifting equipment 118 or take out the target inventory receptacle 112 from the lifting equipment 118.

The lifting equipment 118 is configured to lift the target inventory receptacle 112 to the preset height after the target inventory receptacle 112 is put by the handling equipment 104, so that the operating terminal 116 takes out the item from the target inventory receptacle 112, or the operating terminal 116 puts the item into the target inventory receptacle 112. In addition, the lifting equipment 118 lowers the target inventory receptacle 112 to an original height when the operating terminal 116 puts the item into the target inventory receptacle 112.

The original height is the height of the lifting equipment 118 when the handling equipment 104 puts the target inventory receptacle 112 into the lifting equipment 118. In addition, the lifting equipment 118 may be provided with an inventory receptacle rack, so that the handling equipment 104 can place the target inventory receptacle 112 on the inventory receptacle rack of the lifting equipment 118

Figure 19:
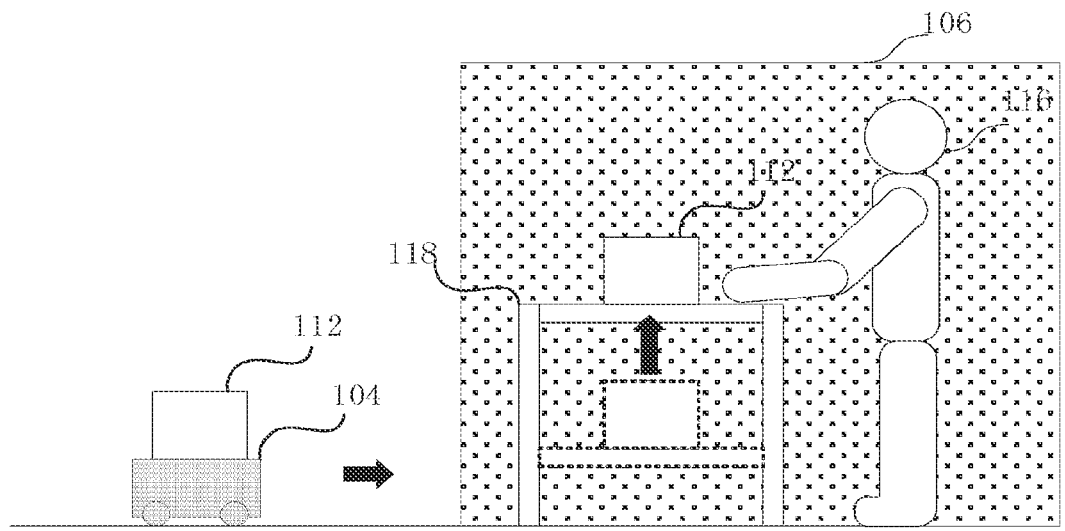
FIG. 19 is a schematic diagram of operation of a lifting equipment according to an embodiment of this application.

FIG. 19 is a schematic diagram of operation of a lifting equipment according to an embodiment of this application. As can be seen, the handling equipment 104 may move to the destination 106 to put the target inventory receptacle 112 into the lifting equipment 118, and then the lifting equipment 118 is raised in height for the convenient operation of the operating terminal 116.

Further, in one or more embodiments provided in this application, after transporting the target inventory receptacle 112 to the destination 106, the handling equipment 104 may wait for the operating terminal 116 to pick the item, and then transport the target inventory receptacle 112 back to the inventory rack 108 to return the target inventory receptacle 112.

Alternatively, in one or more embodiments provided in this application, a handling equipment 104 that delivers the target inventory receptacle 112 to the destination 106 may not be the handling equipment 104 that takes out the target inventory receptacle 112 from the destination 106. Therefore, the system can make full use of the time for item picking at the destination, and avoid the time delay caused by the waiting of the handling equipment 104, improving the working efficiency of the handling equipment 104.

Specifically, the control system 100 is further configured to continue to send other handling instructions to the handling equipment 104 after determining that the handling equipment 104 places the target inventory receptacle 112 on the lifting equipment 118.

The lifting equipment 118 is configured to send notification information to the control system 100 when item picking is completed. The notification information is used for notifying the control system 100 that the item in the target inventory receptacle 112 is picked.

The control system 100 is further configured to determine a new handling task according to the notification information sent by the lifting equipment 118, determine a handling equipment 104 that performs the new handling task, and send a handling instruction to the determined handling equipment 104 according to the new handling task, so that the handling equipment 104 receiving the handling instruction reaches the lifting equipment 118 at the destination 106 and takes out the target inventory receptacle 112.

Figure 20:
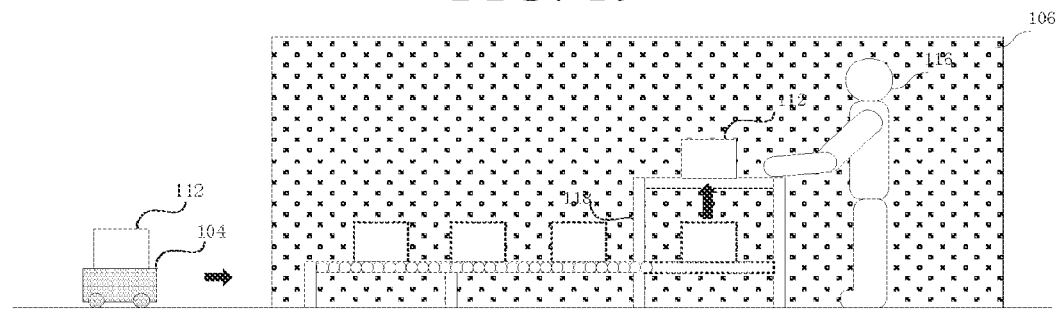
FIG. 20 is a schematic diagram of a temporary storage area of a destination according to an embodiment of this application.

Further, in one or more embodiments provided in this application, the destination 106 is further provided with a temporary storage area for temporarily storing the target inventory receptacle 112 transported by the handling equipment 104. The temporary storage area may be in the form of a roll line, as shown in FIG. 20. FIG. 20 is a schematic diagram of a temporary storage area of a destination according to this application.

In one or more embodiments provided in this application, the temporary storage area of the destination 106 may be arranged at the lifting equipment 118. The lifting equipment 118 is further configured to temporarily store the target inventory receptacle 112 placed by the handling equipment 104 in the temporary storage area, and lift the temporarily stored target inventory receptacle 112 to the preset height when the operating terminal 116 is idle, so that the operating terminal 116 takes out the item from the target inventory receptacle 112, or put the item into the target inventory receptacle 112.

Figure 21:
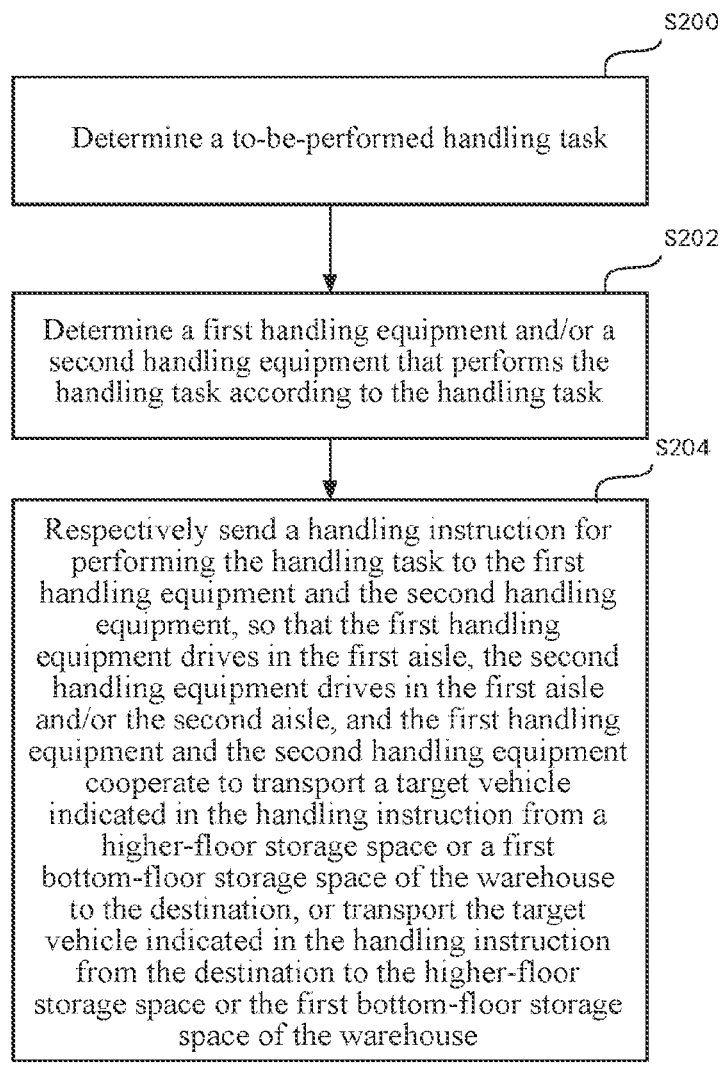
FIG. 21 is a schematic diagram of an inventory process according to an embodiment of this application.

Based on the system shown in FIG. 11, an embodiment of this application further provides an inventory method shown in FIG. 21.

FIG. 21 is a schematic flowchart of an inventory method according to an embodiment of this application. A warehouse includes one or more storage and retrieval equipments, one or more handling equipments, and one or more destinations, the warehouse is formed by at least one inventory rack, the inventory rack is provided with a plurality of floors, space between the at least one inventory rack forms a first aisle, each floor of the inventory rack is provided with at least two storage spaces in a longitudinal direction, a row of first bottom-floor storage spaces are arranged on a bottom floor of at least one side of the inventory rack adjacent to the first aisle, at least some of the first bottom-floor storage spaces on the bottom floor of the inventory rack are provided with inventory receptacles, at least some of higher-floor storage spaces on higher floors other than the bottom floor of the inventory rack are provided with inventory receptacles, space where no first bottom-floor storage space is arranged on the bottom floor of the inventory rack forms a second aisle, the second aisle runs through the bottom floor of the inventory rack, and a handling process may further include the following steps:

S200: Determine a to-be-performed handling task.

It should be noted that, the handling task is a task for the handling equipment to transport inventory receptacles for the warehouse to realize item sorting, handling, exiting or warehousing, and the like, which may be determined according to a received order or as needed, which is not limited in this application.

S202: Determine a storage and retrieval equipment and/or a handling equipment that performs the handling task according to the handling task.

S204: Respectively send a handling instruction for performing the handling task to the storage and retrieval equipment and the handling equipment, so that the storage and retrieval equipment drives in the first aisle, the handling equipment drives in the first aisle and/or the second aisle, and the storage and retrieval equipment and the handling equipment cooperate to transport a target inventory receptacle indicated in the handling instruction from a higher-floor storage space or a first bottom-floor storage space of the warehouse to the destination, or transport the target inventory receptacle indicated in the handling instruction from the destination to the higher-floor storage space or the first bottom-floor storage space of the warehouse.

The inventory method provided in the embodiments of this application may be specifically implemented by a control system, and the control system may be one or more equipments, such as a distributed server formed by a plurality of servers, which is not limited in this application. Since there may be one or more inventory racks, a control system may be arranged to determine handling tasks of the plurality of inventory racks and dispatch the equipments to perform the handling tasks; or a plurality of control systems may respectively determine different handling tasks and dispatch the equipments to perform the handling tasks. Moreover, when there are a plurality of control systems, each control system can share the determined handling tasks, so that the plurality of control systems can cooperate to complete the plurality of handling tasks.

In addition, for the detailed execution process of the method, reference may be made to the description of the process of performing the handling task in the foregoing inventory system, which is not repeated in this application.

Further, in this embodiment of this application, a description is made by taking an example where the control system executes the handling dispatching process. The storage and retrieval equipment may transport the target inventory receptacle from above or from the side of the higher-floor storage space. Therefore, when the handling instruction is sent to the determined storage and retrieval equipment to cause the storage and retrieval equipment to perform the handling task, the control system may determine a higher-floor storage space corresponding to the handling task according to the handling task, and send the handling instruction to the determined storage and retrieval equipment according to a position of the higher-floor storage space and a position of a first aisle adjacent to the higher-floor storage space, so that the storage and retrieval equipment takes out a target inventory receptacle indicated in the handling instruction from the side of the higher-floor storage space at the first aisle to the storage and retrieval equipment according to the handling instruction, or the storage and retrieval equipment puts the target inventory receptacle indicated in the handling instruction from the storage and retrieval equipment to the higher-floor storage space according to the handling instruction.

In addition, in this embodiment of this application, the handling equipment may alternatively take out items from the first bottom-floor storage space and the second bottom-floor storage space in different manners, for example, to transport the target inventory receptacle from below or from the side of the bottom-floor storage spaces. Therefore, when sending the handling instruction to the determined handling equipment to cause the handling equipment perform the handling task, the control system may determine the first bottom-floor storage space or the second bottom-floor storage space corresponding to the handling task according to the handling task, and send the handling instruction to the handling equipment according to the position of the first bottom-floor storage space or the second bottom-floor storage space and the first aisle or the second aisle adjacent to the bottom-floor storage spaces, so that the handling equipment takes out, from the first aisle or the second aisle adjacent to the first bottom-floor storage space or the second bottom-floor storage space, the target inventory receptacle indicated in the handling instruction from the side of the bottom-floor storage space to the handling equipment, or put the target inventory receptacle indicated in the handling instruction from the handling equipment to the first bottom-floor storage space or the second bottom-floor storage space from the side.

Further, the control system may further determine the first bottom-floor storage space or the second bottom-floor storage space corresponding to the handling task according to the handling task, and send the handling instruction to the handling equipment according to the position of the first bottom-floor storage space or the second bottom-floor storage space, so that the handling equipment enters the bottom of the first bottom-floor storage space or the second bottom-floor storage space, and takes out the target inventory receptacle indicated in the handling instruction from the bottom of the first bottom-floor storage space or the second bottom-floor storage space to the handling equipment, or put the target inventory receptacle indicated in the handling instruction from the handling equipment to the first bottom-floor storage space or the second bottom-floor storage space.

Based on the method shown in FIG. 21, through the inventory racks arranged in the warehouse, the space between the inventory racks is used as the first aisle, and the space that runs through the bottom floor of the inventory rack and where no first bottom-floor storage space is arranged on the bottom floor of the inventory rack is used as the second aisle. The storage and retrieval equipment drives in the first aisle, the handling equipment may drive in the first aisle and/or the second aisle, and the storage and retrieval equipment and the handling equipment can be used together in the warehouse to transport items. Since the driving speed of the handling equipment capable of driving on the bottom floor is not affected by the height thereof, and the aisle of the handling equipment may be different from that of the storage and retrieval equipment, so that the cooperation of the handling equipment that can drive quickly and the storage and retrieval equipment that can transport from higher-floor storage spaces avoids the problems caused by the slow driving of the storage and retrieval equipment, and improves the warehouse handling efficiency and picking efficiency.

In the 1990s, improvements of a technology can be clearly distinguished between hardware improvements (for example, improvements to a circuit structure such as a diode, a transistor, or a switch) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. During implementation of the embodiments of this application, the function of the units may be implemented in the same piece of or multiple pieces of software and/or hardware.

A person skilled in the art is to understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage device, or any other non-transmission medium, which may be configured to store information accessible by a computing device. Based on the definition in this specification, the computer-readable medium does not include transitory computer-readable media (transitory media), such as a modulated data signal and a carrier.

It should be further noted that, the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the commodity, or the device that includes the element.

A person skilled in the art should understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, a CD-ROM, an optical memory, and the like) that include computer-usable program code.

This application can be described in the general context of computer-executable instructions executed by a computer, for example, a program module. Generally, the program module includes a routine, a program, an object, a component, a data structure, and the like for executing a particular task or implementing a particular abstract data type. This application may also be practiced in distributed computing environments in which tasks are performed by remote processing devices that are connected by using a communication network. In a distributed computing environment, the program module may be located in both local and remote computer storage media including storage devices.

The embodiments of this application are all described in a progressive manner, for same or similar parts in the embodiments, reference may be made to such embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of this application, and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. An inventory system, comprising:
a control system;
a plurality of storage and retrieval equipments in communication with the control system; and
a plurality of handling equipments in communication with the control system, wherein each handling equipment of the plurality of handling equipments includes a jacking mechanism and a target identification assembly;
wherein the plurality of storage and retrieval equipments operate in a storage area of the inventory system, a plurality of inventory racks are deployed in the storage area, each inventory rack of the plurality of inventory racks has a plurality of compartments, each compartment of the plurality of compartments comprises a plurality of storage spaces, and an inventory receptacle is placed on each storage space of the plurality of storage spaces;
wherein the control system is configured to: determine a target inventory receptacle from the inventory receptacles in the storage area; determine a target storage and retrieval equipment from the plurality of storage and retrieval equipments and a target handling equipment from the plurality of handling equipments; and send a dispatching instruction to the target storage and retrieval equipment and to the target handling equipment;
wherein the target storage and retrieval equipment is configured to: drive, in response to the dispatching instruction, to a first position specified in the dispatching instruction corresponding to the target inventory receptacle, take out the target inventory receptacle, and directly or indirectly provide the target inventory receptacle to the target handling equipment; and
wherein the target handling equipment is configured to: drive, in response to the dispatching instruction, to a second position specified in the dispatching instruction, obtain the target inventory receptacle provided by the target storage and retrieval equipment using the jacking mechanism and the target identification assembly of the target handling equipment, wherein the target identification assembly identifies and aligns the target inventory receptacle as the jacking mechanism lifts the target inventory receptacle, and transport the target inventory receptacle from the storage area to a workstation specified in the dispatching instruction for a service operation.

2. The inventory system according to claim 1,
wherein the target storage and retrieval equipment is further configured to place the target inventory receptacle at a preset transfer position; and
wherein the target handling equipment is further configured to drive, in response to the dispatching instruction, to the preset transfer position to obtain the target inventory receptacle.

3. The inventory system according to claim 1,
wherein the target storage and retrieval equipment is further configured to take out the target inventory receptacle from a storage space of a first position on an inventory rack of the plurality of inventory racks and place the target inventory receptacle in a storage space of a second position on an inventory rack of the plurality inventory racks, wherein the first position is higher than the second position; and
wherein the target handling equipment is further configured to drive, in response to the dispatching instruction, to a position corresponding to the storage space of the second position on an inventory rack of the plurality of inventory racks, and obtain the target inventory receptacle.

4. The inventory system according to claim 1,
wherein the target handling equipment is further configured to drive, in response to the dispatching instruction, to a preset position, wherein the preset position is adjacent to the first position where the target storage and retrieval equipment takes out the target inventory receptacle; and
wherein the target storage and retrieval equipment is further configured to place the target inventory receptacle on the target handling equipment.

5. The inventory system according to claim 1,
wherein each storage space of the plurality of storage spaces includes a storage space identification mark; and
wherein each inventory receptacle of the plurality of inventory receptacles includes a receptacle identification mark.

6. The inventory system according to claim 1,
wherein a bottommost compartment of each inventory rack of the plurality of inventory racks is a storage floor;
wherein the target storage and retrieval equipment is further configured to place the target inventory receptacle on a bottommost compartment of a given inventory rack serving as the storage floor; and
wherein the target handling equipment is further configured to obtain the target inventory receptacle from the bottommost compartment of the given inventory rack serving as the storage floor.

7. The inventory system according to claim 1,
wherein a storage rack is arranged below a bottommost compartment of each inventory rack of the plurality of inventory racks;
wherein the target storage and retrieval equipment is further configured to place the target inventory receptacle on a storage rack of a given inventory rack; and
wherein the target handling equipment is further configured to obtain the target inventory receptacle from the storage rack of the given inventory rack.

8. The inventory system according to claim 1,
wherein the target inventory receptacle is located in a rear row of a compartment in which the target inventory receptacle is located in a longitudinal direction; and
wherein the target storage and retrieval equipment is further configured to directly take out the target inventory receptacle based on there being no other inventory receptacle in a front row of the compartment in which the target inventory receptacle is located; or sequentially take out, based on there being at least one inventory receptacle in the front row of the compartment in which the target inventory receptacle is located that blocks the target inventory receptacle, the at least one inventory receptacle in the front row, sequentially place the at least one inventory receptacle in at least one storage space of a temporary storage rack, take out the target inventory receptacle, place the target inventory receptacle in a storage space of the temporary storage racks, and return the at least one inventory receptacle in the front row to the compartment from which the at least one inventory receptacle in the front row was taken out.

9. An inventory method, comprising:
determining, by a control system, a target inventory receptacle from a plurality of inventory receptacles in a storage area of an inventory system;
determining, by the control system, a target storage and retrieval equipment from a plurality of storage and retrieval equipments and a target handling equipment from a plurality of handling equipments, wherein each handling equipment of the plurality of handling equipments includes a jacking mechanism and a target identification assembly; and
sending, by the control system, a dispatching instruction to the target storage and retrieval equipment and to the target handling equipment, wherein the plurality of storage and retrieval equipments and the plurality of handling equipments are in communication with the control system, the plurality of storage and retrieval equipments operate in the storage area, a plurality of inventory racks are deployed in the storage area, each inventory rack of the plurality of inventory racks has a plurality of compartments, each compartment of the plurality of compartments comprises a plurality of storage spaces, and an inventory receptacle is placed on each storage space of the plurality of storage spaces;
wherein the dispatching instruction causes the target storage and retrieval equipment to drive to a first position specified in the dispatching instruction, take out the target inventory receptacle, and directly or indirectly provide the target inventory receptacle to the target handling equipment; and
wherein the dispatching instruction further causes the target handling equipment to drive to a second position specified in the dispatching instruction, obtain the target inventory receptacle provided by the target storage and retrieval equipment using the jacking mechanism and the target identification assembly of the target handling equipment, wherein the target identification assembly identifies and aligns the target inventory receptacle as the jacking mechanism lifts the target inventory receptacle, and transport the target inventory receptacle from the storage area to a workstation specified in the dispatching instruction for a service operation.

10. The method according to claim 9, wherein the target storage and retrieval equipment directly or indirectly providing the target inventory receptacle to the target handling equipment comprises:
placing, by the target storage and retrieval equipment in response to the dispatching instruction, the target inventory receptacle at a preset transfer position; and
driving, by the target handling equipment in response to the dispatching instruction, to the preset transfer position to obtain the target inventory receptacle.

11. The method according to claim 9, wherein the target storage and retrieval equipment directly or indirectly providing the target inventory receptacle to the target handling equipment comprises:
taking out, by the target storage and retrieval equipment in response to the dispatching instruction, the target inventory receptacle from a storage space of a first position on an inventory rack of the plurality of inventory racks and placing the target inventory receptacle in a storage space of a second position on an inventory rack of the plurality of inventory racks, wherein the first position is higher than the second position; and
driving, by the target handling equipment in response to the dispatching instruction, to a position corresponding to the storage space of the second position on an inventory rack of the plurality of inventory racks, and obtain the target inventory receptacle.

12. The method according to claim 9,
wherein each storage space of the plurality of storage spaces includes a storage space identification mark; and
wherein each inventory receptacle of the plurality of inventory receptacles includes a receptacle identification mark.

13. The method according to claim 9,
wherein the target inventory receptacle is located in a rear row of a compartment in which the target inventory receptacle is located in a longitudinal direction; and
wherein the target storage and retrieval equipment taking out the target inventory receptacle comprises:
directly taking out, by the target storage and retrieval equipment, the target inventory receptacle based on there being no other inventory receptacle in a front row of the compartment in which the target inventory receptacle is located; or
sequentially taking out, by the target storage and retrieval equipment based on there being at least one inventory receptacle in the front row of the compartment in which the target inventory receptacle is located that blocks the target inventory receptacle, the at least one inventory receptacle in the front row, sequentially placing the at least one inventory receptacle in at least one storage space of a temporary storage rack, taking out the target inventory receptacle, placing the target inventory receptacle in a storage space of the temporary storage racks, and returning the at least one inventory receptacle in the front row to the compartment from which the at least one inventory receptacle in the front row was taken out.

14. An inventory system, comprising:
one or more control systems;
one or more storage and retrieval equipments;
one or more handling equipments; and
one or more destinations;
wherein a warehouse is formed by at least one inventory rack, the at least one inventory rack is provided with a plurality of floors, and the one or more control systems are in communication with the one or more storage and retrieval equipments and the one or more handling equipments;
wherein space adjacent to the at least one inventory rack forms a first aisle, each floor of the plurality of floors of the at least one inventory rack is provided with at least two storage spaces in a longitudinal direction, a row of first bottom-floor storage spaces are arranged on a bottom floor of at least one side of the at least one inventory rack adjacent to the first aisle, at least some of the first bottom-floor storage spaces on the bottom floor of the at least one inventory rack are provided with inventory receptacles, and at least some of higher-floor storage spaces on higher floors other than the bottom floor of the at least one inventory rack are provided with inventory receptacles;
wherein space where no first bottom-floor storage spaces are arranged on the bottom floor of the at least one inventory rack forms a second aisle, and the second aisle runs through the bottom floor of the at least one inventory rack;

wherein the one or more control systems are configured to determine, according to a handling task, a storage and retrieval equipment from the one or more storage and retrieval equipments and a handling equipment from the one or more handling equipments that performs the handling task, and send a handling instruction for performing the handling task to the storage and retrieval equipment and to the handling equipment, wherein each handling equipment of the one or more handling equipments includes a jacking mechanism and a target identification assembly;

wherein the storage and retrieval equipment drives in the first aisle and is configured to:
  take out, according to the handling instruction sent by the one or more control systems, a target inventory receptacle indicated in the handling instruction from a higher-floor storage space of the at least one inventory rack and put the target inventory receptacle in an idle first bottom-floor storage space, or
  take out the target inventory receptacle indicated in the handling instruction from the first bottom-floor storage space and put the target inventory receptacle in the higher-floor storage space; and wherein the handling equipment drives in one or more of the first aisle or the second aisle, and is configured to:
  take out, according to the handling instruction sent by the one or more control systems, the target inventory receptacle indicated in the handling instruction from the first bottom-floor storage space, or
  put the target inventory receptacle indicated in the handling instruction in the first bottom-floor storage space, and transport the target inventory receptacle indicated in the handling instruction between the first bottom-floor storage space and the one or more destinations, wherein the handling equipment takes out the target inventory receptacle from the first bottom-floor storage space or puts the target inventory receptacle into the first bottom-floor storage space using the jacking mechanism and the target identification assembly of the handling equipment, wherein the target identification assembly identifies and aligns the target inventory receptacle as the jacking mechanism lifts the target inventory receptacle.

15. The inventory system according to claim 14,
wherein bottom floors of each inventory rack of the at least one inventory rack are provided with the first bottom-floor storage spaces; and
wherein the handling equipment drives in the first aisle.

16. The inventory system according to claim 14,
wherein at least one row of second bottom-floor storage spaces are further arranged on a bottom floor of the at least one inventory rack not adjacent to the first aisle, and at least some of the second bottom-floor storage spaces on the bottom floor of the at least one inventory rack are provided with inventory receptacles; and
wherein space where no first bottom-floor storage space and no second bottom-floor storage space is arranged on the bottom floor of the at least one inventory rack forms a third aisle.

17. The inventory system according to claim 16, wherein the handling equipment is further configured to:
  take out, according to the handling instruction sent by the one or more control systems, the target inventory receptacle indicated in the handling instruction from a second bottom-floor storage space, or put the target inventory receptacle indicated in the handling instruction in the second bottom-floor storage space; and
  transport the target inventory receptacle indicated in the handling instruction between the second bottom-floor storage space and the one or more destinations or between the first bottom-floor storage space and the second bottom-floor storage space.

18. The inventory system according to claim 16,
wherein the one or more control systems are further configured to send a position change instruction to the storage and retrieval equipment; and
wherein the storage and retrieval equipment is further configured to change the target inventory receptacle indicated in the position change instruction from a current storage space to at least one of the first bottom-floor storage space, the second bottom-floor storage space, or the higher-floor storage space above the second aisle according to the position change instruction.

19. The inventory system according to claim 18, wherein the storage and retrieval equipment is further configured to change the target inventory receptacle indicated in the position change instruction from the first bottom-floor storage space to the higher-floor storage space above the second aisle according to the position change instruction.

20. The inventory system according to claim 16,
wherein heights of inventory receptacles of at least some of the first bottom-floor storage spaces and at least some of the second bottom-floor storage spaces on the bottom floor of the at least one inventory rack are greater than a height of the handling equipment when carrying no inventory receptacle; and
wherein the handling equipment is further configured to selectively drive below the at least some of the first bottom-floor storage spaces and the at least some of the second bottom-floor storage spaces when carrying no inventory receptacle, or transport the target inventory receptacle in a piggybacking manner and leave from below the at least some of the first bottom-floor storage spaces and the at least some of the second bottom-floor storage spaces.

\* \* \* \* \*